(12) United States Patent
Yokoyama et al.

(10) Patent No.: US 7,679,268 B2
(45) Date of Patent: Mar. 16, 2010

(54) POLYMER ACTUATOR HAVING ACTIVE MEMBER LAYER THAT EXPANDS OR CONTRACTS UPON APPLICATION OF ELECTRIC FIELD

(75) Inventors: Kazuo Yokoyama, Osaka (JP);
Katsuhiko Asai, Nara (JP); Yuji Kudoh, Kyoto (JP); Masaki Yamamoto, Nara (JP)

(73) Assignee: Panasonic Corporation, Osaka (JP)

( * ) Notice: Subject to any disclaimer, the term of this patent is extended or adjusted under 35 U.S.C. 154(b) by 406 days.

(21) Appl. No.: 11/806,001

(22) Filed: May 29, 2007

(65) Prior Publication Data

US 2007/0257582 A1 Nov. 8, 2007

Related U.S. Application Data

(63) Continuation of application No. PCT/JP2006/315481, filed on Aug. 4, 2006.

(30) Foreign Application Priority Data

Aug. 5, 2005 (JP) .............................. 2005-227342

(51) Int. Cl.
*H01L 41/04* (2006.01)
(52) U.S. Cl. ...................... 310/328; 310/800
(58) Field of Classification Search ................ 310/328, 310/800

See application file for complete search history.

(56) References Cited

U.S. PATENT DOCUMENTS

| | | | |
|---|---|---|---|
| 5,556,700 A | 9/1996 | Kaneto et al. | |
| 7,034,432 B1 * | 4/2006 | Pelrine et al. | 310/309 |
| 2002/0195326 A1 * | 12/2002 | Hunter et al. | 200/181 |
| 2005/0200243 A1 * | 9/2005 | Spangler et al. | 310/338 |
| 2006/0050189 A1 * | 3/2006 | Ito et al. | 349/33 |
| 2006/0076540 A1 | 4/2006 | Zama et al. | |

FOREIGN PATENT DOCUMENTS

| | | |
|---|---|---|
| JP | 11-169394 | 6/1999 |
| JP | 11169394 A * | 6/1999 |

(Continued)

OTHER PUBLICATIONS

SG. Wax, R.R. Sands, Smart Structures and Materials 1999: "*Electroactive Polymer Actuators and Devices*", Proc. SPIE, vol. 3669, pp. 2-10, Mar. 1999.

(Continued)

*Primary Examiner*—J. SanMartin
(74) *Attorney, Agent, or Firm*—Wenderoth, Lind & Ponack, L.L.P.

(57) ABSTRACT

A plane thin-type polymer actuator is provided with a conductive active member serving as a first electrode layer, and a second electrode layer, with at least a first electrolytic layer made in contact with the active member layer. The first electrolytic layer being sealed between the two electrode layers so that, by applying an electric field between the two electrode layers, the active member layer is expanded and contracted. In this structure, the first electrolytic layer is a solid-state electrolyte having a specific elastic modulus, or a liquid-state electrolyte. A holding member is provided to maintain the thickness between the active member layer and the second electrode layer.

14 Claims, 29 Drawing Sheets

FOREIGN PATENT DOCUMENTS

| | | | |
|---|---|---|---|
| JP | 11280639 A | * | 10/1999 |
| JP | 2000-83389 | | 3/2000 |
| JP | 2004-197069 | | 7/2004 |
| JP | 2004-254497 | | 9/2004 |
| JP | 2005-051949 | | 2/2005 |
| JP | 3811495 | | 8/2006 |
| JP | 2006353034 A | * | 12/2006 |
| WO | 2004/068690 | | 8/2004 |
| WO | 2005/076452 | | 8/2005 |

OTHER PUBLICATIONS

Patent Cooperation Treaty (PCT) International Preliminary Report on Patentability, issued Sep. 9, 2008.

* cited by examiner

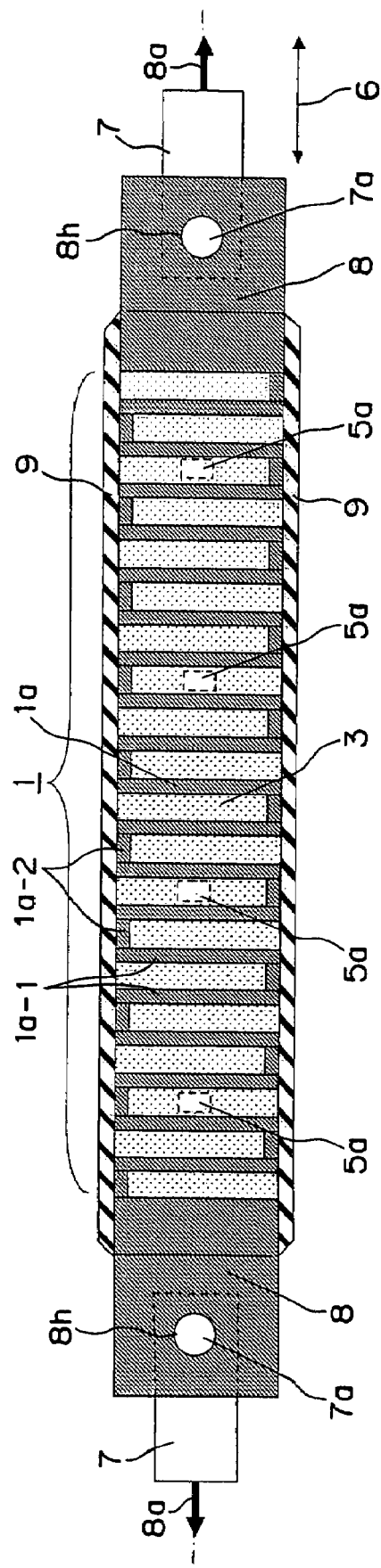

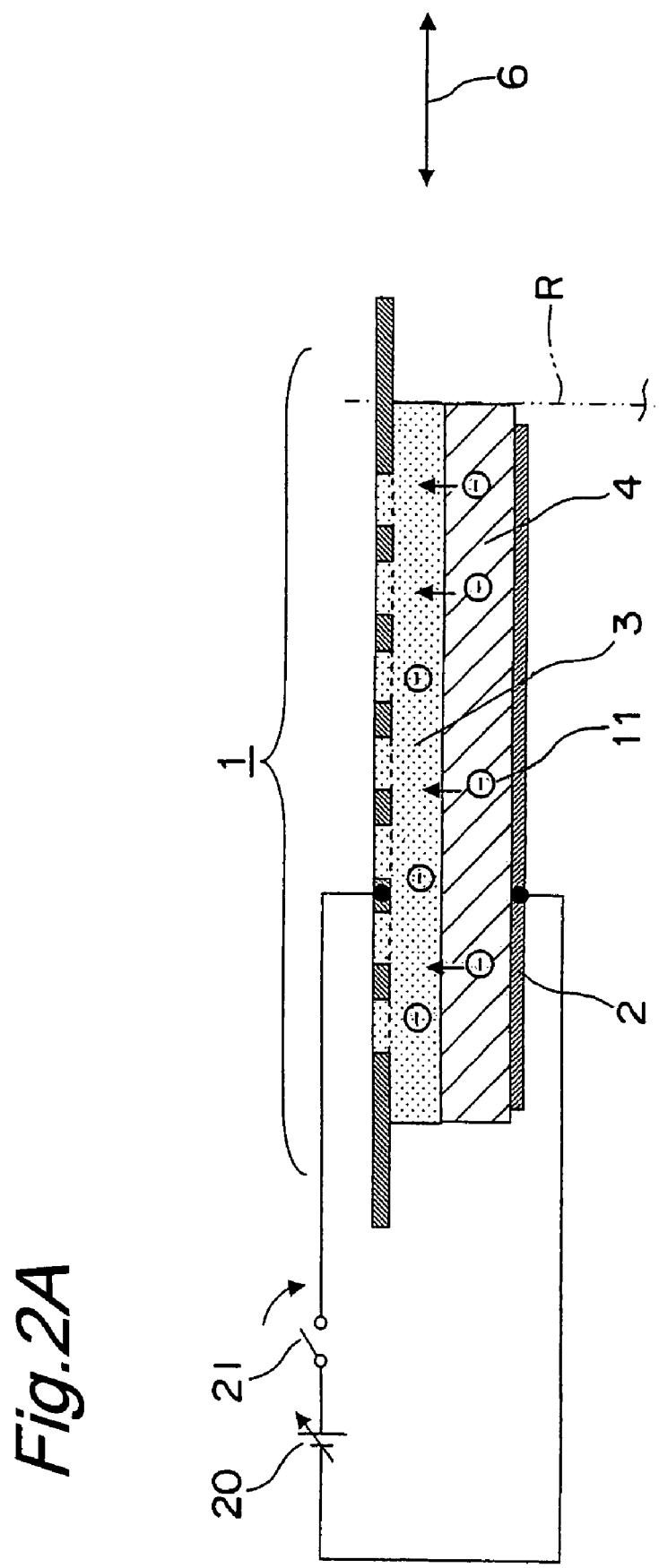

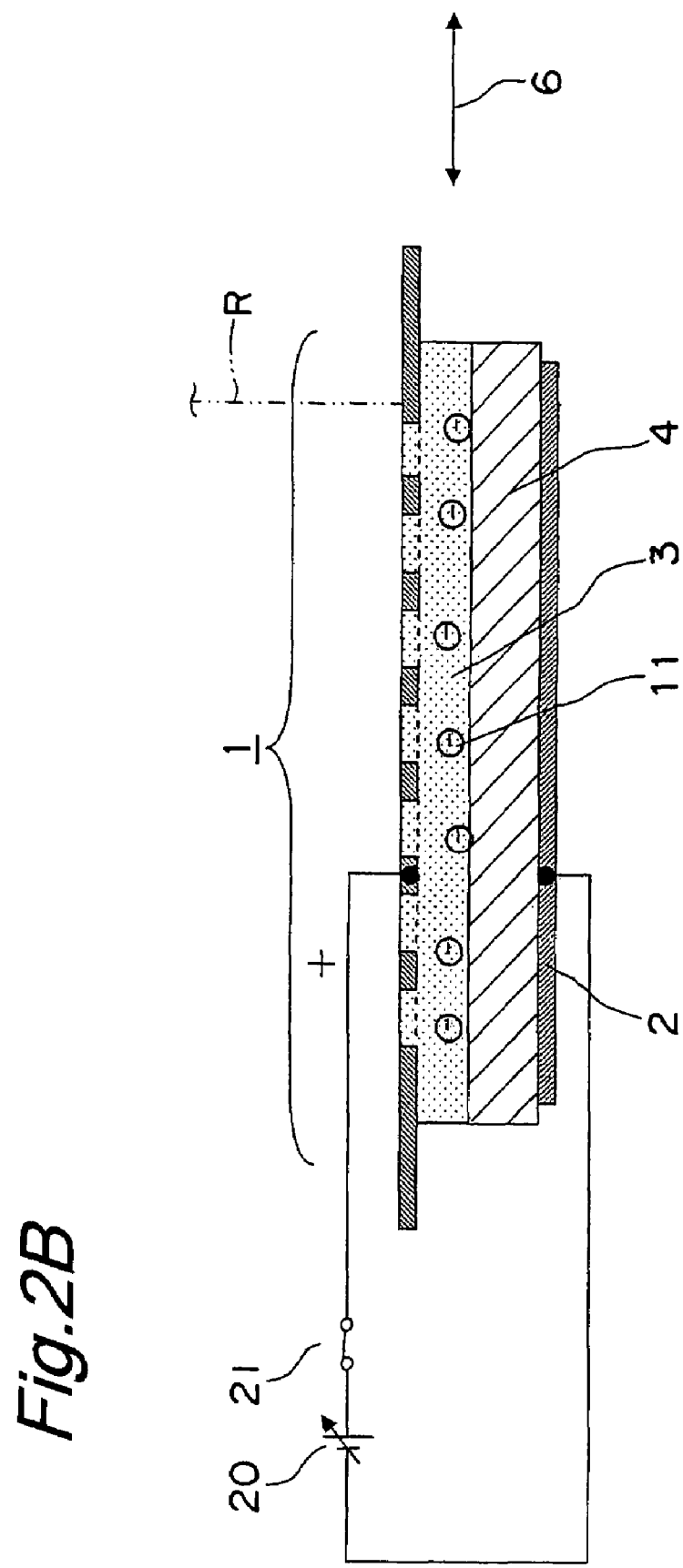

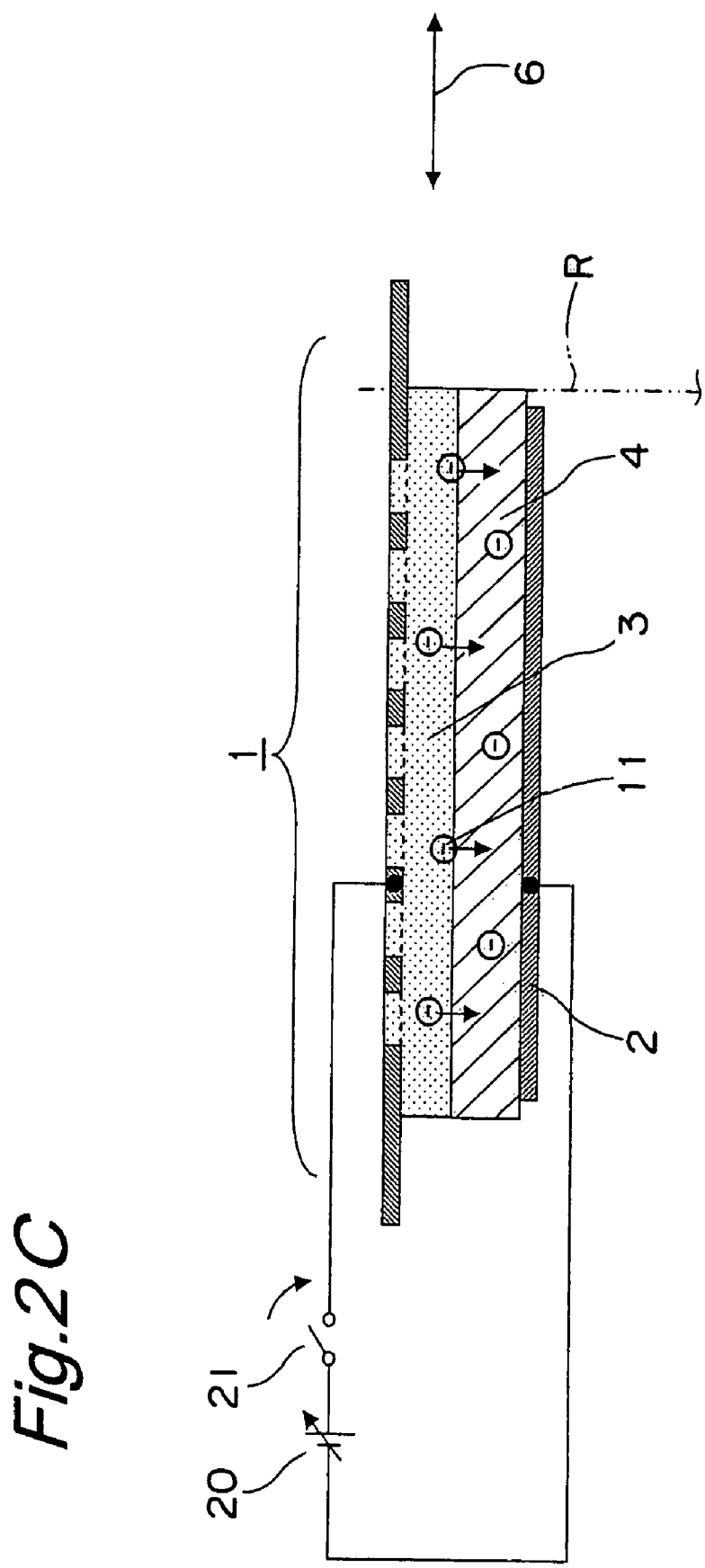

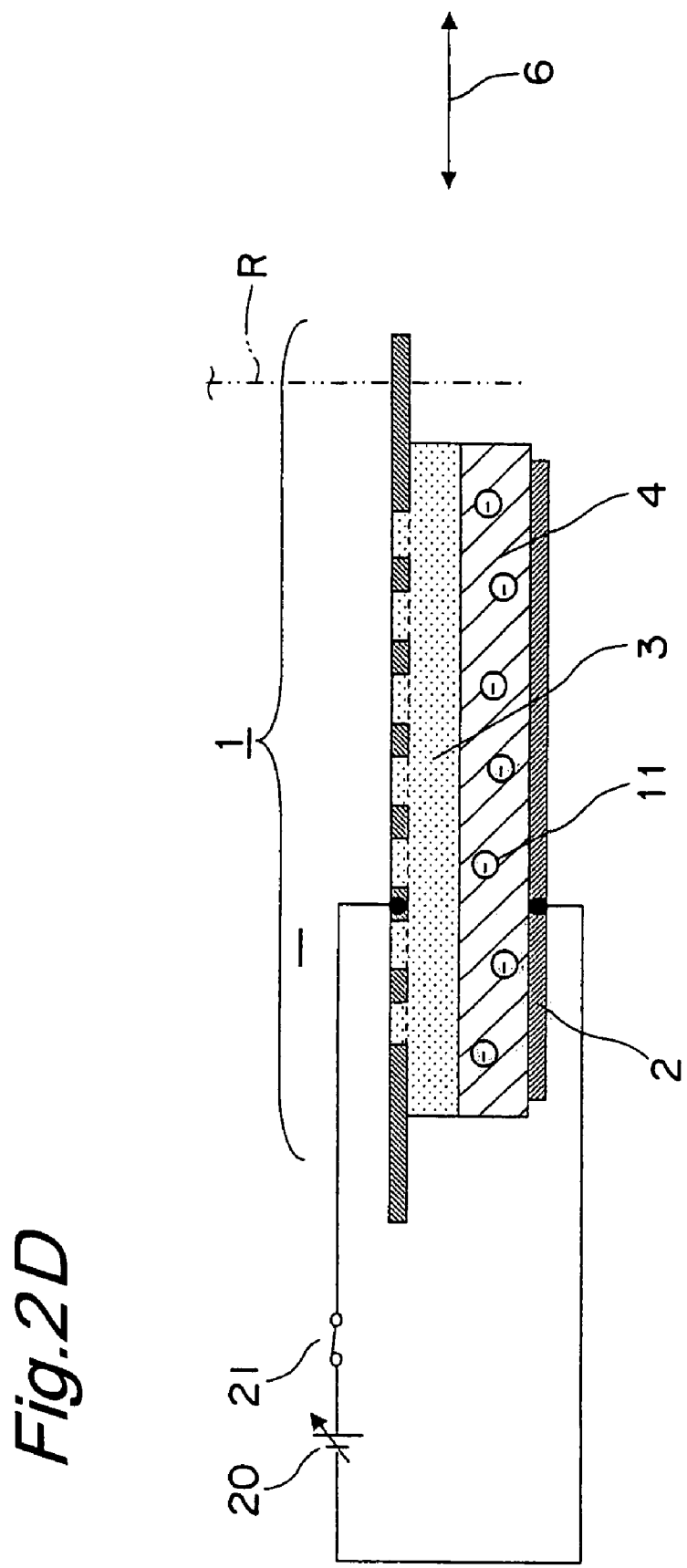

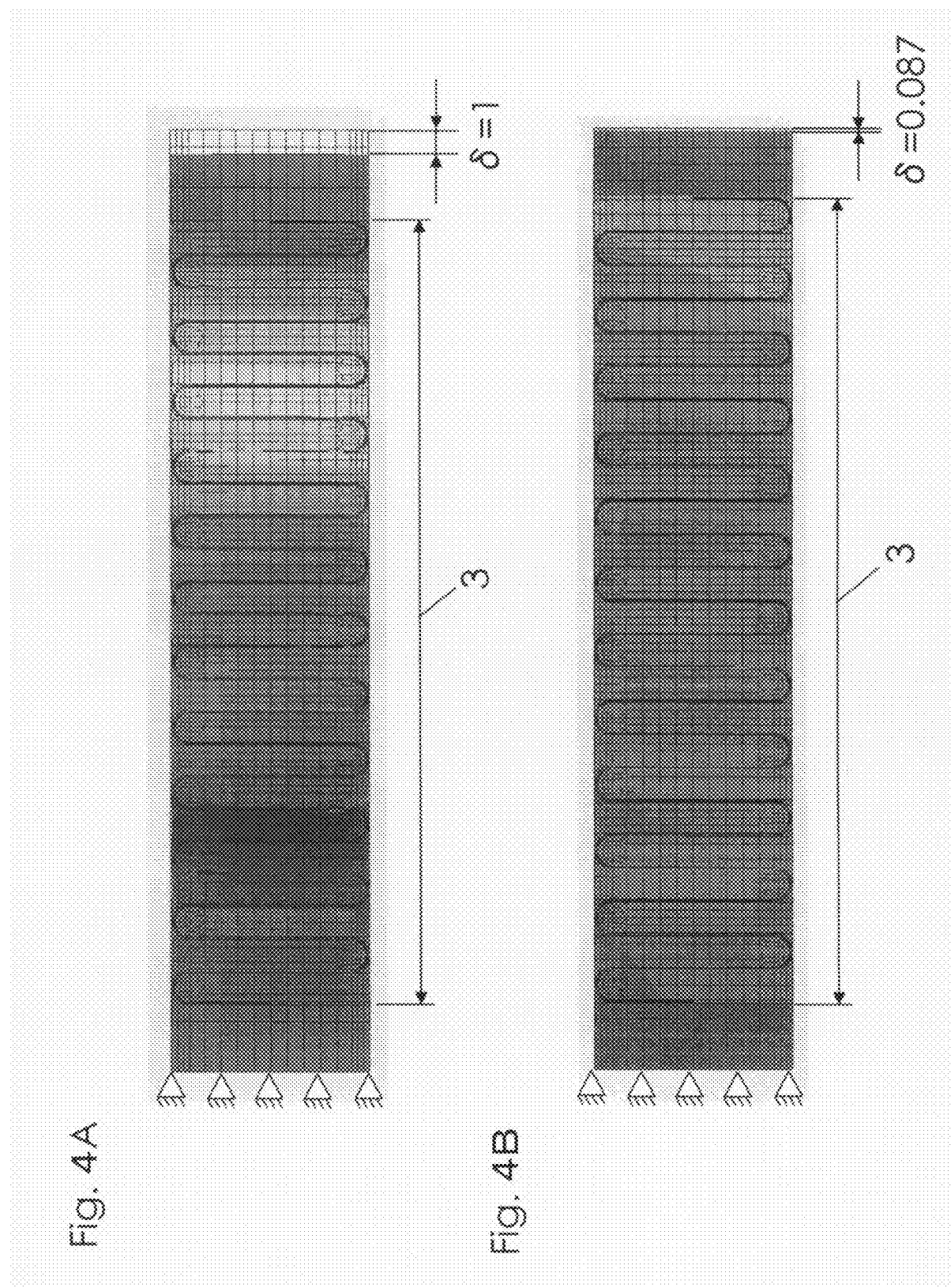

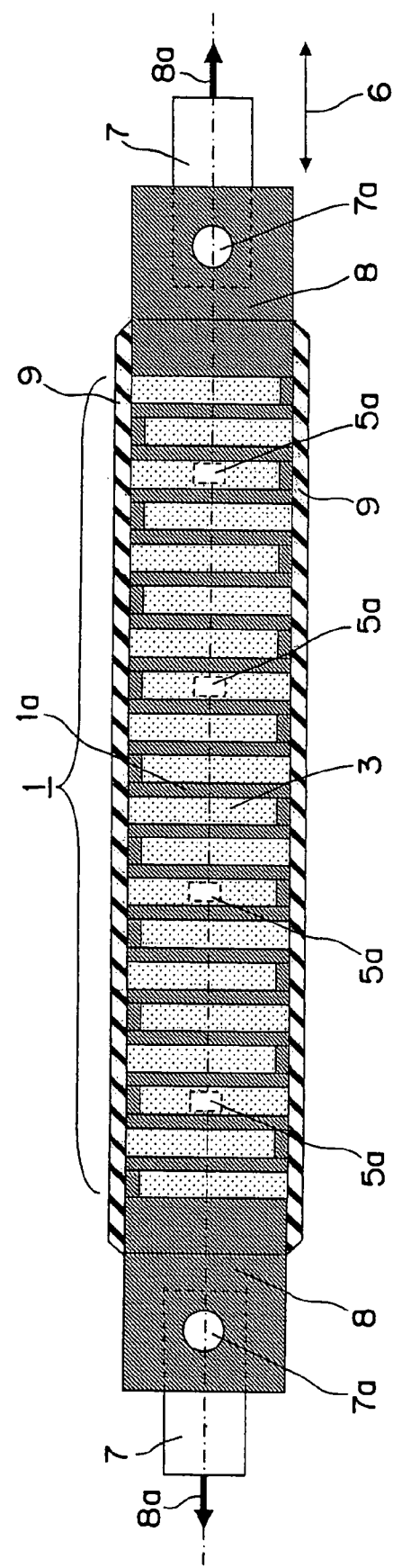

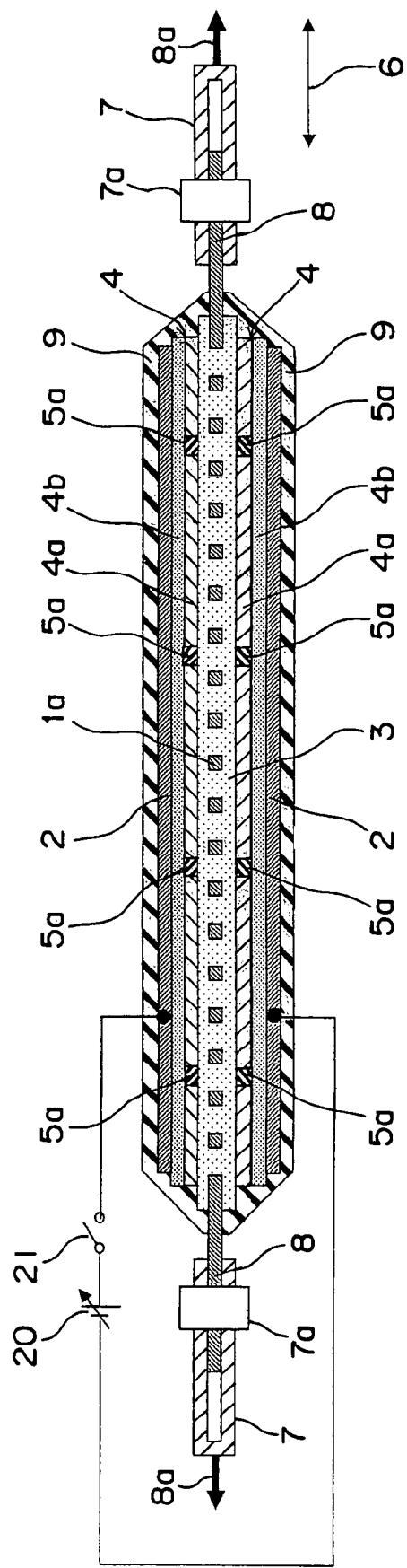

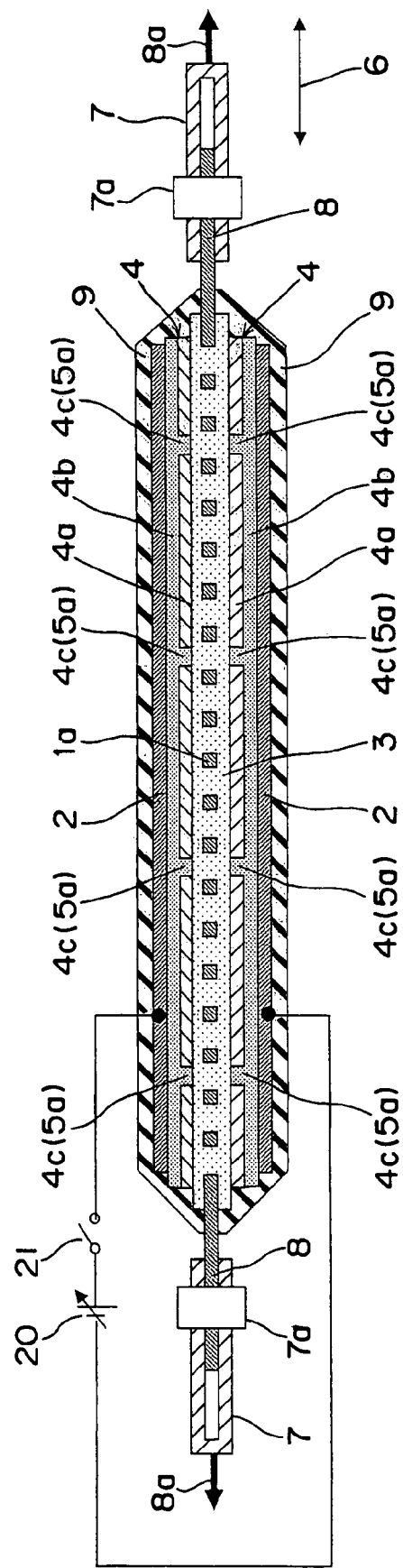

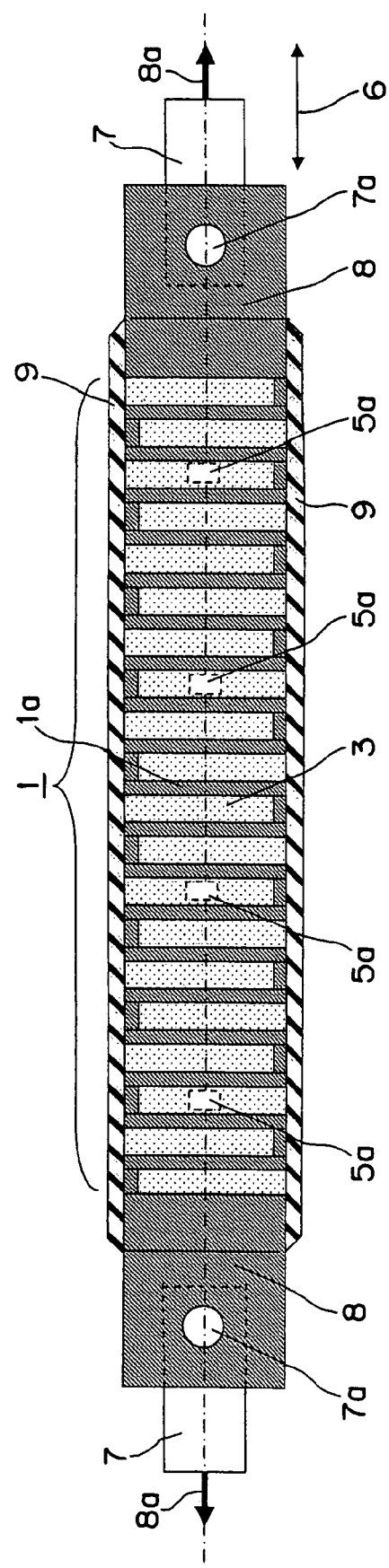

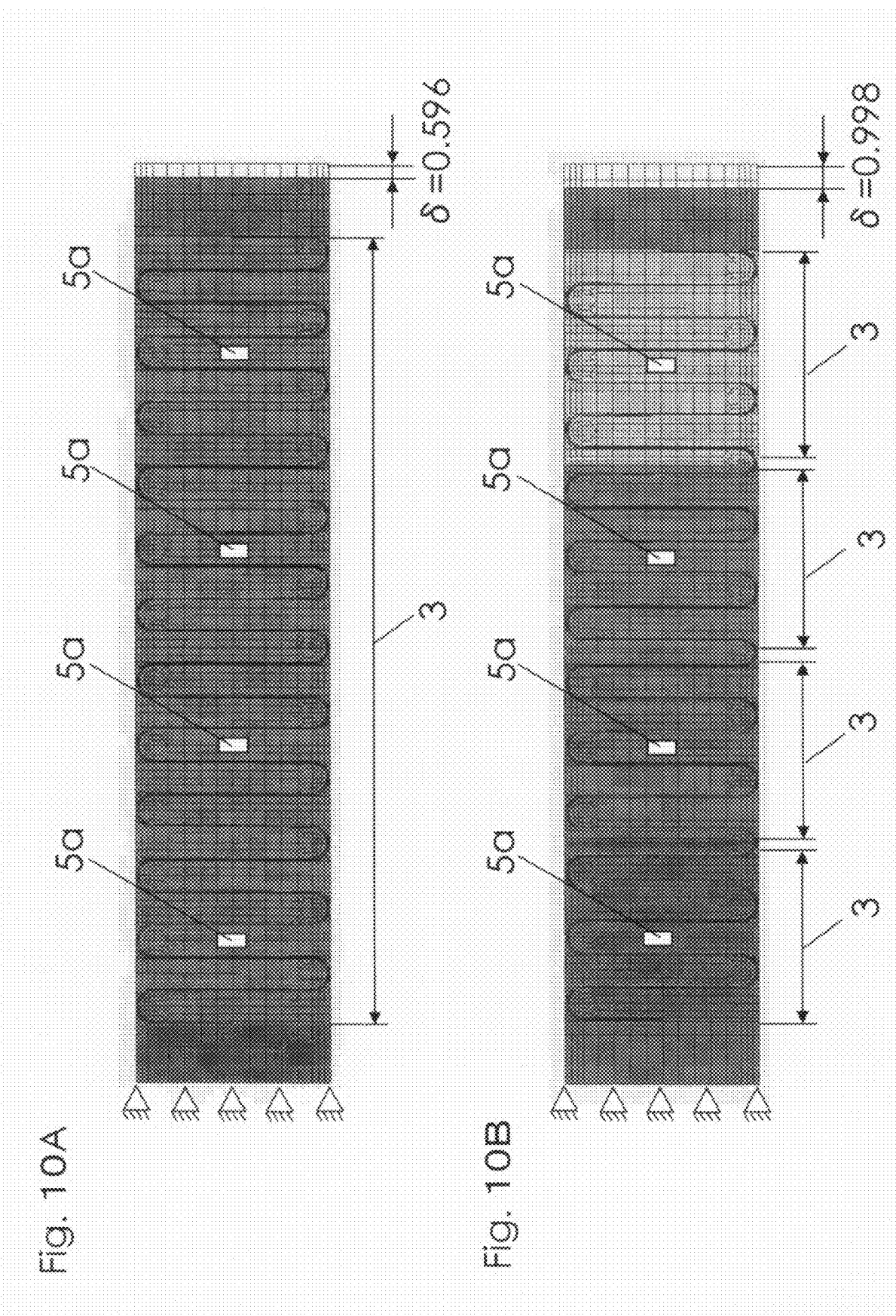

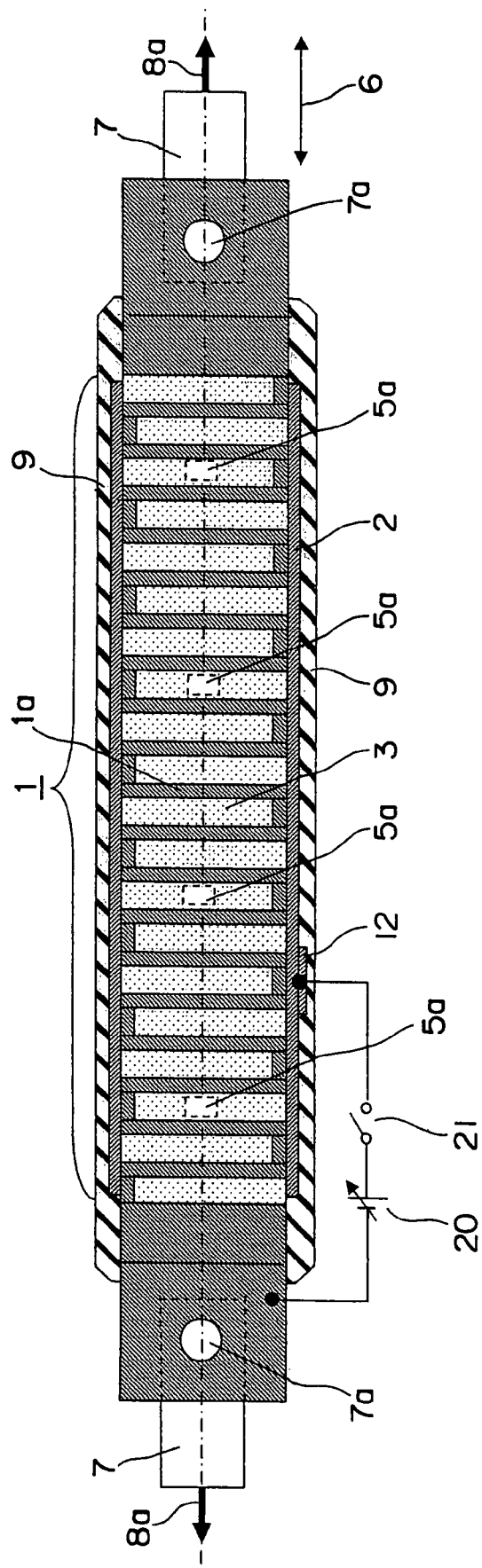

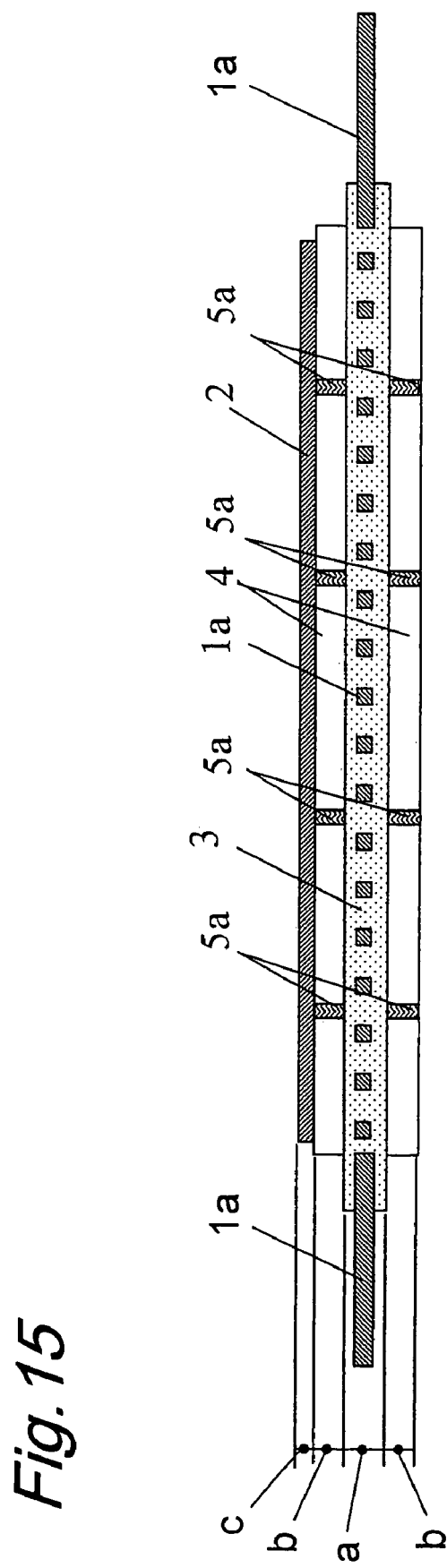

POLYMER ACTUATOR HAVING ACTIVE MEMBER LAYER THAT EXPANDS OR CONTRACTS UPON APPLICATION OF ELECTRIC FIELD

This is a continuation application of International Application No. PCT/JP2006/315481, filed Aug. 4, 2006.

BACKGROUND OF THE INVENTION

The present invention relates to a flexible light-weight polymer actuator that is deformed upon receipt of an electrical stimulus, and applicable to home-service robots and the like.

With respect to a driving source for a joint driving mechanism used for conventional industrial robots, devices such as an electromagnetic motor, a hydraulic actuator, and a pneumatic actuator are used. The joint driving mechanisms using such driving sources include a mechanism using an electromagnetic motor and a reduction mechanism mainly made of metal as well as a mechanism using a hydropneumatic cylinder made of metal, and are made of a hard heavy material, and used under control at a specific place in a factory.

In contrast, with respect to the driving source used for apparatuses such as robots that are expected to be actively operated closely to people for jobs, such as house chores and work assist jobs as well as nursing assist jobs for the aged and physically-challenged person, in homes, offices, and hospitals, there have been demands for allowing the driving source itself to be small-sized, light-weight and flexible, and also to be used safely. With respect to such an actuator, among the pneumatic actuators, a pneumatic actuator made from rubber, which is highly flexible, has been proposed; however, in order to drive this, auxiliary machineries such as a compressor and a controlling valve are required, with the result that the weight-reducing attempt for the entire system has a limitation. Here, artificial muscle actuators using various polymer materials that are light-weight and highly flexible have been proposed, and the practical use thereof has been desired.

With respect to the polymer actuators that are operated by an electric stimulus, Non-Patent Document 1 has described those as a key-note lecture. With respect to a polymer gel, a metal composite ion polymer, an inherently conducting polymer, a polymer having a carbon-based material dispersion-type conductivity, carbon-nano-tubes, and dielectric elastomers, polymer actuators that are driven by an electric stimulus have been examined. Among these, the inherently conducting polymer has been highly expected as an actuator which can be driven with a comparatively low voltage, provides a generated stress that exerts a capability exceeding a biological muscle, and has light-weight and flexible features.

Moreover, a polymer material having conductivity with a carbon-based material dispersed therein, for example, a polymer material having conductivity with carbon-nano-tubes dispersed therein have also been highly expected as actuators that exert a high generated force.

Conventionally, most of these polymer actuators are operated in an electrolytic solution. With respect to an example of an actuator that can be operated in the air, Patent Document 1 has disclosed a bent type actuator in which a solid-state electrolyte is sandwiched between two films made of an inherently conducting polymer, which are compatibly used as electrodes and active member layers. Moreover, with respect to another example of the same type of actuator that can be operated in the air, Patent Document 2 has disclosed an actuator of a translation type in which an electrolytic layer is sandwiched between a conductive polymer layer to form an active member layer and an opposing electrode.

Patent Document 1: Japanese Unexamined Patent Publication No. 11-169394

Patent Document 2: Japanese Unexamined Patent Publication No. 2005-51949

Non-Patent Document 1: S G. Wax, R. R. Sands, Smart Structures And Materials 1999: Electroactive Polymer Actuators and Devices, Proc. SPIE, Vol. 3669, pp. 2-10, 1999

In the structure of the bent type actuator shown in Patent Document 1, however, the movement of the actuator is limited by deflection, with the result that, although a comparatively large displacement can be obtained, the actuator fails to exert a great force due to low deflection rigidity.

Moreover, Patent Document 2 has disclosed, for example, the actuator in which, with respect to an actuator operable in the air, a conductive polymer is expanded and contracted to be deformed in the longitudinal direction, which is different from the deflection deformation, and string-shaped inherently conducting polymer materials, which are compatibly used as an electrode and an active member layer, are placed in the center of a column-shaped solid-state electrolyte, with electrodes facing the periphery of the column-shaped solid-state electrolyte being formed; however, the conductive polymer portion that is expanded and contracted as the actuator has a cylinder shape, and the resulting issue is that, when bundled, the effective cross-sectional area of the active member layer, which contributes to driving, becomes smaller.

In contrast, Patent Document 2 has disclosed the translation type actuator having laminated layers, which is capable of increasing the effective cross-sectional area of the active member layer, and also exerts a great force. In the actuator of this type, however, in the case when the electrolytic layer is made softer so as not to disturb the expansion and contraction of the active member layer, after repetitive operations with a large distortion generated in the active member layer, an interlayer separation tends to occur.

Here, with respect to the driving source used for apparatuses such as robots that are expected to be actively operated closely to people for jobs, such as house chores and work assist jobs as well as nursing assist jobs for the aged and physically-challenged person in homes, offices, and hospitals, there have been strong demands for achieving a small-size, light weight, and flexible driving source for an actuator and for consequently realizing a safe actuator.

In order to solve the above-mentioned issues, the present invention relates to a safe actuator using such a small-size, light weight, and flexible driving source, and its objective is to provide a polymer actuator using a polymer material, which can generate a great force, and is operated at high speeds, easily manufactured and in particular, highly resistant to deformation.

SUMMARY OF THE INVENTION

In order to achieve the above-mentioned objectives, the present invention is provided with the following arrangements.

According to a first aspect of the present invention, there is provided a polymer actuator, which is a plane thin-type polymer actuator, comprising:

a conductive active member layer that is compatibly used as an electrode or has an electrode separately installed, and serves as a first electrode layer;

a second electrode layer that is made face to face with the first electrode layer;

a first electrolytic layer at least made in contact with the active member layer and sealed between the two electrode layers, the first electrolytic layer being a solid-state electrolyte having an elastic modulus of 3 kN/m² or less, or a liquid-state electrolyte; and a holding member for maintaining a thickness between the active member layer and the second electrode layer, wherein by applying an electric field between the two electrode layers, at least one type of ions selected from anions and cations are allowed to enter or leave the active member layer through the first electrolytic layer so as to expand or contract the active member layer.

In accordance with the present invention, the electrolytic layer is prepared as a solid-state electrolyte having an elastic modulus of 3 kN/m² or less, or a liquid-state electrolyte so as not to disturb the expanding and contracting operations of the active member layer, and since the electrolytic layer itself does not have a sufficient strength, the thickness between the active member layer and the second electrode layer may be maintained by the holding member so that the interlayer separation can be prevented.

With this structure, the polymer actuator of the present invention, which is used as a driving source for apparatuses such as robots that are expected to be actively operated closely to people for jobs, such as house chores and work assist jobs as well as nursing assist jobs for the aged and physically-challenged person in homes, offices, and hospitals, makes it possible to provide a safe actuator having a small-size, light weight, and flexible driving source. With respect to the safe actuator having such a small-size, light weight, and flexible driving source, the polymer actuator in accordance with the present invention uses a polymer material that can generate a great force, and is operated at high speeds, easily manufactured and in particular, highly resistant to deformation so that the resulting actuator is operable in the air.

BRIEF DESCRIPTION OF THE DRAWINGS

These and other aspects and features of the present invention will become clear from the following description taken in conjunction with the preferred embodiments thereof with reference to the accompanying drawings, in which:

FIG. 1A is a plane view that shows an actuator in accordance with one mode of a first embodiment of the present invention;

FIG. 2A is a cross-sectional view for explaining an operational principle of the actuator in accordance with the first embodiment of the present invention;

FIG. 2B is a cross-sectional view for explaining the operational principle of the actuator in accordance with the first embodiment of the present invention;

FIG. 2C is a cross-sectional view for explaining the operational principle of the actuator in accordance with the first embodiment of the present invention;

FIG. 2D is a cross-sectional view for explaining the operational principle of the actuator in accordance with the first embodiment of the present invention;

FIG. 4A is a deformation view that indicates the results of analytic simulation carried out on the contraction deformation of an active member layer of the actuator in the first embodiment of the present invention;

FIG. 4B is a deformation view that indicates the results of analytic simulation carried out on the contraction deformation of an active member layer of the actuator in the first embodiment of the present invention;

FIG. 7A is a plane view that shows an actuator in accordance with one mode of a second embodiment of the present invention;

FIG. 7B is a cross-sectional view of the actuator in accordance with the one mode of the second embodiment of the present invention;

FIG. 8B is a cross-sectional view of the actuator in accordance with the another mode of the second embodiment of the present invention;

FIG. 9A is a plane view that shows an actuator in accordance with a still another mode of the second embodiment of the present invention;

FIG. 10A is a view that shows the results of analytic simulation by the finite element method, carried out on the deformation in the actuator having the structure shown in FIGS. 9A and 9B, where a second electrode and a second solid-state electrolyte are not divided into portions, and coupled to each other at four positions by using holding members, each having a rectangular shape of 1 mm in length×0.25 mm in width in its plane shape;

FIG. 10B is a view that shows the results of analytic simulation by the finite element method, carried out on the deformation in the actuator having the structure shown in FIGS. 9A and 9B, where a second electrode and a second solid-state electrolyte are divided into four portions, and coupled to each other at four positions by using holding members, each having a rectangular shape of 1 mm in length×0.25 mm in width in its plane shape;

FIG. 13A is a plane view that shows an actuator in accordance with one mode of a fourth embodiment of the present invention;

FIG. 15 is a cross-sectional view that shows a basic unit of an actuator in the fourth embodiment of the present invention.

DETAILED DESCRIPTION OF THE PREFERRED EMBODIMENTS

Figure 1B:
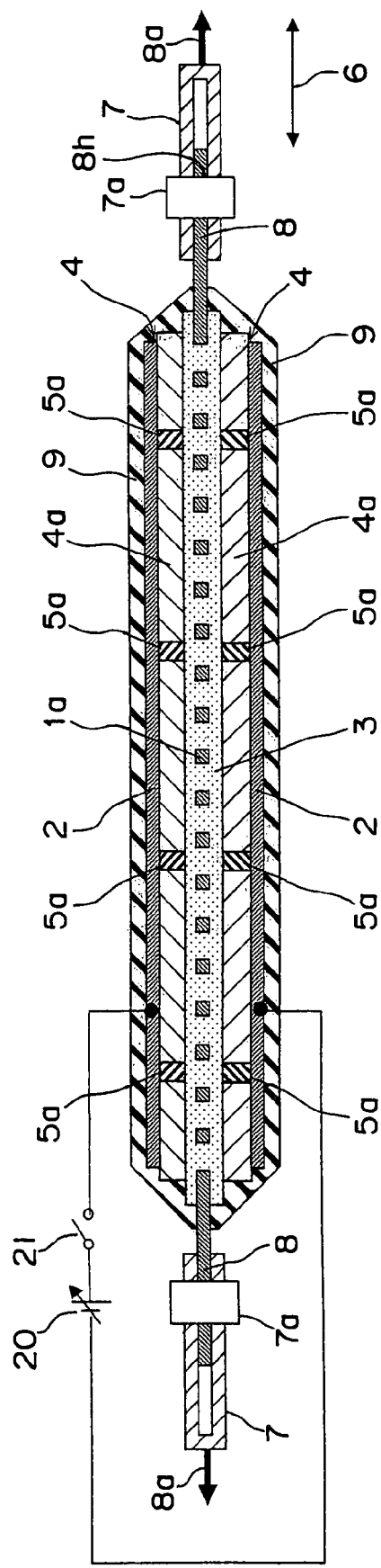
FIG. 1B is a cross-sectional view of the actuator in accordance with the one mode of the first embodiment of the present invention.

Before the description of the present invention proceeds, it is to be noted that like parts are designated by like reference numerals throughout the accompanying drawings.

Referring to Figures, the following description will discuss embodiments of the present invention in detail.

Prior to the detailed description of embodiments of the present invention based upon the drawings, various aspects for the present invention will be explained.

According to a first aspect of the present invention, there is provided a polymer actuator, which is a plane thin-type polymer actuator, comprising:

a conductive active member layer that is compatibly used as an electrode or has an electrode separately installed, and serves as a first electrode layer;

a second electrode layer that is made face to face with the first electrode layer;

a first electrolytic layer at least made in contact with the active member layer and sealed between the two electrode layers, the first electrolytic layer being a solid-state electrolyte having an elastic modulus of 3 $kN/m^2$ or less, or a liquid-state electrolyte; and a holding member for maintaining a thickness between the active member layer and the second electrode layer, wherein by applying an electric field between the two electrode layers, at least one type of ions selected from anions and cations are allowed to enter or leave the active member layer through the first electrolytic layer so as to expand or contract the active member layer.

According to a second aspect of the present invention, there is provided the polymer actuator according to the first aspect, wherein the electrolytic layer interpolated between the two electrode layers is made of only the first electrolytic layer, and the active member layer and the second electrode are coupled to each other by the holding member used for holding the thickness.

According to a third aspect of the present invention, there is provided the polymer actuator according to the first aspect, wherein the electrolytic layer interpolated between the two electrode layers is constituted by the first electrolytic layer made in contact with the active member layer and a second solid-state electrolytic layer made in contact with the first electrolytic layer, and the active member layer and the second solid-state electrolytic layer are coupled to each other by the holding member used for holding the thickness.

According to a fourth aspect of the present invention, there is provided the polymer actuator according to the third aspect, wherein the second solid-state electrolytic layer and the holding member are integrally formed as a solid-state electrolyte.

According to a fifth aspect of the present invention, there is provided the polymer actuator according to the third or fourth aspect, wherein the second electrode layer and the second solid-state electrolyte are divided into a plurality of portions in a driving direction of the actuator.

According to a sixth aspect of the present invention, there is provided the polymer actuator according to the third or fourth aspect, wherein the first electrolytic layer is made from a solid-state electrolyte having an elastic modulus of 3 $kN/m^2$ or less and prepared by gelling an ionic liquid consisting of anions and cations, with a rigidity thereof being made smaller than that of the second solid-state electrolyte.

According to a seventh aspect of the present invention, there is provided the polymer actuator according to the first or fourth aspect, wherein the first electrolytic layer is a liquid-state electrolyte that is an ionic liquid consisting of anions and cations.

According to an eighth aspect of the present invention, there is provided the polymer actuator according to any of the second to fourth aspects, wherein the holding member is formed by solidifying an ionic liquid.

According to a ninth aspect of the present invention, there is provided the polymer actuator according to any of the first to fourth aspects, which is formed by alternately laminating the active member layer, the electrolytic layers and the electrode layer.

According to a 10th aspect of the present invention, there is provided the polymer actuator according to any of the first to fourth aspects, wherein a force action portion of the actuator is coupled to one end of the active member layer in a driving direction of the actuator.

According to an 11th aspect of the present invention, there is provided the polymer actuator according to the tenth aspect, wherein an entire portion of the actuator except for the force action portion is covered with a flexible sealing member that does not disturb action of the force action portion.

According to a 12th aspect of the present invention, there is provided the polymer actuator according to any of the first to fourth aspects, wherein the active member layer is an inherently conducting polymer layer or a conductive member containing at least one material selected from a group consisting of carbon-based fine particles, metal-based fine particles, metal-oxide fine particles, carbon nano-fibers, and carbon nano-tubes.

According to a 13th aspect of the present invention, there is provided the polymer actuator according to any of the first to fourth aspects, wherein the holding member is disposed, with its longitudinal direction being set in a direction orthogonal to expansion and contraction directions of the active member layer.

According to a 14th aspect of the present invention, there is provided the polymer actuator according to any of the first to fourth aspects, wherein the holding member is formed to have a cross section having a trapezoidal shape or a cross section having a cone shape so that a cross-sectional area on a second electrode layer side is made greater than a cross-sectional area on an opposite side thereof.

Referring to Figures, the following description will discuss embodiment of the present invention in detail.

First Embodiment

FIGS. 1A and 1B are a plane view and a cross-sectional view that show a flat-plate thin-type polymer actuator in accordance with one mode of the first embodiment of the present invention.

The actuator shown in FIGS. 1A and 1B has a structure in which a first electrode layer 1 is constituted by an active member layer 3 that has a plane thin-type plate shape of a rectangular parallelepiped, and is made from a conductive polymer, and a flexible electrode 1a of metal such as stainless steel, which is installed in a manner so as to be embedded in the active member layer 3 at a substantially middle point in the thickness direction thereof. A second electrode layer 2 having a rectangular plate shape, made of metal such as aluminum foil, is placed on each of the two sides of the first electrode layer 1 in the thickness direction in a manner so as to be made face to face with the first electrode layer 1 and set apart therefrom. An electrolytic layer 4 is formed so as to be made in contact with the second electrode layer 2 and the conductive active member layer 3 (in the first embodiment, for example, the electrolytic layer 4 is formed only by the first electrolytic layer 4a). In this structure, by applying a voltage between the first electrode layer 1 and the second electrode layer 2, the conductive active member layer 3 is allowed to expand and contract so as to execute operations as the actuator. Here, in particular, the electrolytic layer 4 is prepared as an electrolytic layer 4a having a specific low elastic modulus, as will be described later, so as not to interfere with the expanding and contracting operations of the active member layer 3; therefore, in the case when repetitive operations are carried out with a large distortion being generated, the interlayer portion tends to be separated. In order to prevent this issue, the active member layer 3 and the second electrode layer 2 are coupled to each other by holding members (in other words, gap- (or thickness-) holding members 5a).

A force action portion 8, prepared as an extended portion of the rectangular plate shape of the first electrode layer 1, is formed on each of the ends of this actuator in the longitudinal direction, and a hole 8h is formed in the force action portion 8 on the pattern forming side opposite to the end edge of the force action portion 8. A pin 7a of a load hook 7 is inserted into this hole 8h so that an action force 8a is positively exerted on the load hook 7. By applying a voltage between the first electrode layer 1 and the second electrode layer 2 from a power supply 20 through a switch 21, the active member layer 3 is allowed to expand and contract in its longitudinal directions, that is, expanding and contracting directions (in other words, output directions of a driving force of the actuator) 6 so that operations as the actuator are carried out.

These expansion and contraction are caused by ions or electrons contained in the electrolytic layer 4 that are allowed to enter and leave the conductive polymer layer prepared as the active member layer 3. These expansion and contraction are generated by various reasons depending on the materials of the active member layer 3, and in the case when the active member layer 3 is made from a conducting polymer, the deformation is considered to be caused by the following mechanisms: since the ions have a bulk to a certain extent, the bulk of the inherently conducting polymer layer is also changed in accordance with the entering and leaving of the ions that take place following its doping and undoping; a change in the conformation of a polymer chain structure of the conducting polymer takes place following a redox action; and an electrostatic repulsion takes place due to the same kind of charges injected through a voltage application. Moreover, also in the case when the active member layer 3 is made from a conductive polymer in which carbon-based fine particles are contained in a polymer, although these expansion and contraction are not caused by the redox action, the deformation is considered to be caused by entering and leaving of the ions as well as by an electrostatic repulsion between the same kind of charges, and following the entering and leaving of the ions and electrons, the active member layer 3 is expanded and contracted through the same mechanisms as those in the case when the active member layer 3 is made from a conducting polymer.

In order to make the operational principle easily understood, among these mechanisms of deformation, FIGS. 2A, 2B, 2C, and 2D show the states of deformations due to the expansion and contraction caused by doping or undoping of anions (negative ions) in the conducting polymer used as the active member layer 3, by using a schematic cross-sectional view indicating the lower half of the actuator shown in FIG. 1B. For example, in a certain material system, such as a system in which polypyrrole, electrolytic polymerized in an aqueous solution of polyphenol sulfonic acid (PPS), is used as the inherently conducting polymer, and this is operated in an aqueous solution of sodium phosphoric acid hexafluoride ($NaPF_6$), these doping and undoping of anions are considered to mainly form the mechanism of deformations. Moreover, in another material system, such as a system in which polypyrrole, electrolytic copolymerized in a propylene carbonate (PC) solution of tetrabutyl ammonium phosphoric acid hexafluoride ($TBA.PF_6$), is used as the inherently conducting polymer, and this is operated in an ethylmethyl imidazolium-trifluoromethane sulfonyl imide (EMI.TFSI) solution serving as an ionic liquid, doping and undoping of cations are allowed to mainly form the mechanism of deformations. FIG. 2A shows a state in which no voltage is applied to the electrodes, that is, a switch-off state. FIG. 2B shows a state in which a positive voltage is applied to the active member layer 3 side. Anions, located uniformly in the electrolytic layer 4 at the time of non-application of voltage, are drawn toward the active member layer 3 side on the positive electrode side (see anions indicated by arrows in FIGS. 2A and 2B), and allowed to enter from the electrolytic layer 4 into the active member layer 3, with the result that, following this oxidizing process, the volume of the active member layer 3 is expanded so that the active member layer 3 is extended in an expanding and contracting direction 6 along the lamination layer face of the active member layer 3. FIG. 2B shows a state in which the left end of the actuator in the expanding direction 6 is secured, with the right end being allowed to extend from the reference position R on the right end in the switch-off state. FIG. 2C shows a state in which no voltage is applied to the electrode in the switch-off state, and contrary to FIG. 2B, FIG. 2D shows a state in which a negative voltage is applied to the active member layer 3. Anions, located in the active member layer 3, are drawn toward the opposing electrode 2 (see anions indicated by arrows in FIGS. 2C and 2D), and separately released into the electrolytic layer 4 from the active member layer 3, with the result that the volume of the active member layer 3 is contracted following this reduction process so that the active member layer 3 is shrunk in the expanding and contracting direction 6 along the lamination layer face of the active member layer 3. Here, FIG. 2D shows a state in which the left end of the actuator in the expanding and contracting direction 6 is secured, with the right end being shrunk from the reference position R on the right end in the switch-off state. In another material system, there is also a state in which entering and leaving of cations (positive ions) through the active member layer 3 of the conducting polymer layer or mutual entering and leaving of anions and cations therethrough cause the expansion and contraction; however, in this case, only the state of entering and leaving of anions is simply indicated in the Figures, and the mechanism of expansion and contraction is explained.

In this case, the shape of the flexible electrode 1a is prepared as a zig-zag pattern so as not to interfere with the expansion and contraction of the active member layer 3 generated in its expanding and contracting direction 6 (patterned (pattern-formed) so as to prepare low rigidity in the expanding and contracting direction 6 (longitudinal direction of the actuator in FIG. 1A) of the active member layer 3), and the flexible electrode 1a is closely disposed so as to cover the entire active member layer 3; therefore, in comparison with a structure without the flexible electrode 1a, it becomes possible to uniformly apply a voltage to the active member layer 3 instantaneously. For this reason, the entering and leaving of the ions are generated at high speeds so that the active member layer 3 can be expanded and contracted at high speeds. In the patterned shape of the flexible electrode 1a in FIGS. 1A and 1B, a number of elongated rectangular patterned stripes 1a-1 in the width direction are disposed with equal intervals in the longitudinal direction 6 so as to extend along the width direction (width direction in the actuator) that is substantially orthogonal to the longitudinal direction 6, and coupling portions 1a-2, each prepared as a short rectangular-shaped stripe that extends along the longitudinal direction, are also disposed, with the adjacent patterned stripes 1a-1 in the width direction (one example of a band shape) being coupled by each coupling portion 1a-2 at end portions in the width direction that are made face to face with each other; thus, the patterned strips are formed into a shape that is bent at each of the end portions in the width direction of the actuator. When the adjacent patterned stripes 1a-1 in the width direction are mutually coupled at the end portions by each coupling portion 1a-2, the coupling portions 1a-2 are arranged in a staggered manner along the longitudinal direction so that the flexible electrode 1a is formed into a substantially zig-zag shape. Here, the substantially zig-zag shape refers to an elongated shape that continues in the longitudinal direction 6 with at least one cut-out or space being formed in the width direction. When the substantially zig-zag shape is prepared as a uniform pattern, the resulting actuator is easily operation-controlled. In the space formed by the adjacent patterned stripes 1a-1 in the width direction and the coupling portions 1a-2, one portion of the active member layer 3 is allowed to enter so that, in FIG. 1A, each flexible electrode 1a is placed substantially in the middle portion of the active member layer 3 in the thickness direction.

As described above, the flexible electrode 1a is patterned to have lower rigidity in the longitudinal direction 6 that is the expanding and contracting direction of the active member layer 3 and also to have higher rigidity in the width direction substantially orthogonal to the longitudinal direction 6; thus, a large distortion can be generated without interfering with the expansion and contraction of the active member layer 3. The inventors, etc. of the present invention have found that this function for generating a large distortion provides not only a passive function simply not to interfere with the expansion and contraction, but also a positive effect for increasing the generated distortion by applying an anisotropy in the rigidity derived from the patterned flexible electrode 1a.

Moreover, by preparing the flexible electrode 1a as plate-shaped electrodes that also have a function as a supporting member, the active member layer 3, which is difficult in handling when prepared as a single thin member, can be made to be easily handled. Here, the function as the supporting member means that the rigidity of at least one portion of the plate-shaped electrodes having such a function is greater than the rigidity of the active member layer 3 so as to exert the function for holding and supporting the active member layer 3. Moreover, since the flexible electrode 1a has a flat-plate shape, the respective constituent elements serving as the actuator are also allowed to have flat structures that can be easily laminated. With respect to the ratio of the cross section of the active member layer 3 that relates to the expansion and contraction of the laminated actuator, since the flat lamination structure of this type is prepared, the resulting advantage is that the packing density is easily increased.

With respect to the specific structure for patterning the flexible electrode 1a so as to have lower rigidity in the longitudinal direction that is an expanding or contracting direction, a structure in which a number of thin elongated stripes 1a-1 are disposed in the width direction substantially orthogonal to the longitudinal direction 6 as described above, with these stripes being coupled by the coupling portions 1a-2 in a bent zig-zag pattern is preferably used. Although the in-plane rigidity of the flat plate is very high, such a patterned structure makes it possible to easily achieve low rigidity in the longitudinal direction 6. This structure simultaneously achieves high rigidity in the width direction substantially orthogonal to the longitudinal direction 6 so that an anisotropic property in the rigidity is prepared between the longitudinal direction and the direction substantially orthogonal to the longitudinal direction.

In general, in order to provide a large displacement in an actuator, it is preferable to make the length of the expansion and contraction portion longer by aligning the expansion or contraction direction 6 of the actuator with the longitudinal direction of the actuator; however, not limited to this structure, the width direction orthogonal to the expansion or contraction direction 6 may be aligned with the longitudinal direction (not shown). In other words, in the present invention, the expansion or contraction direction 6 of the actuator is not intended to be limited to the longitudinal direction of the actuator.

In the first embodiment, the electrolytic layer 4 is prepared as an electrolytic layer 4a having a specific low elastic modulus as will be described later so as not to interfere with the expanding and contracting operations of the active member layer 3. Since this electrolytic layer 4 itself fails to provide a sufficient strength, the active member layer 3 and the second electrode layer 2 are coupled with each other, in particular, by using the holding members 5a interposed therebetween, in order to prevent an interlayer separation. In order to make comparisons between cases with and without the holding member 5a used for maintaining the interlayer thickness, analytic simulations were carried out by using the finite element method, and the following description will discuss the comparison and examination on the effects thereof.

Figure 3A:
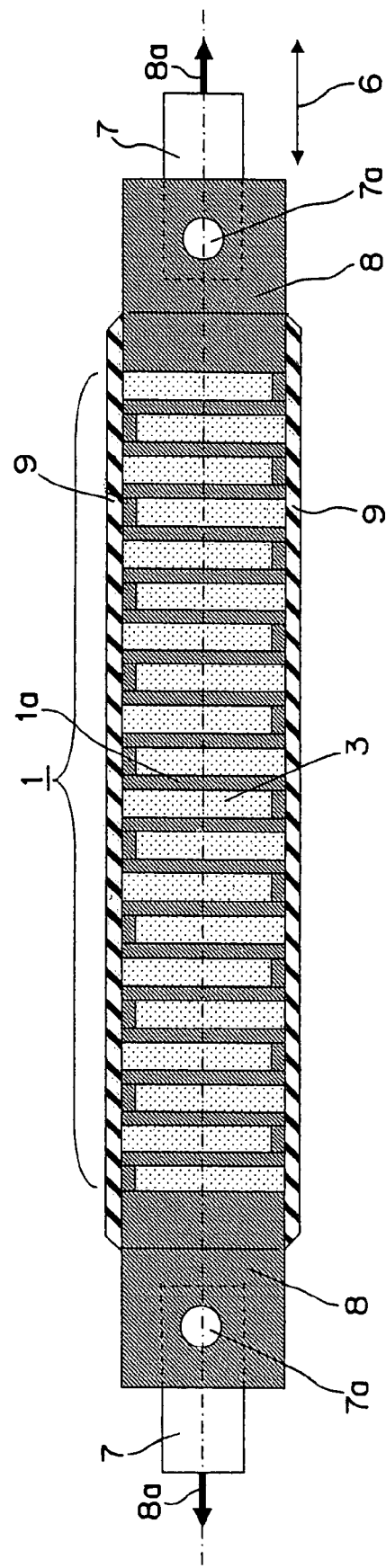
FIG. 3A is a plane view for showing an actuator that is given as a comparative example of the present invention, which is the actuator in the first embodiment of the present invention from which its holding member is omitted.
Figure 3B:
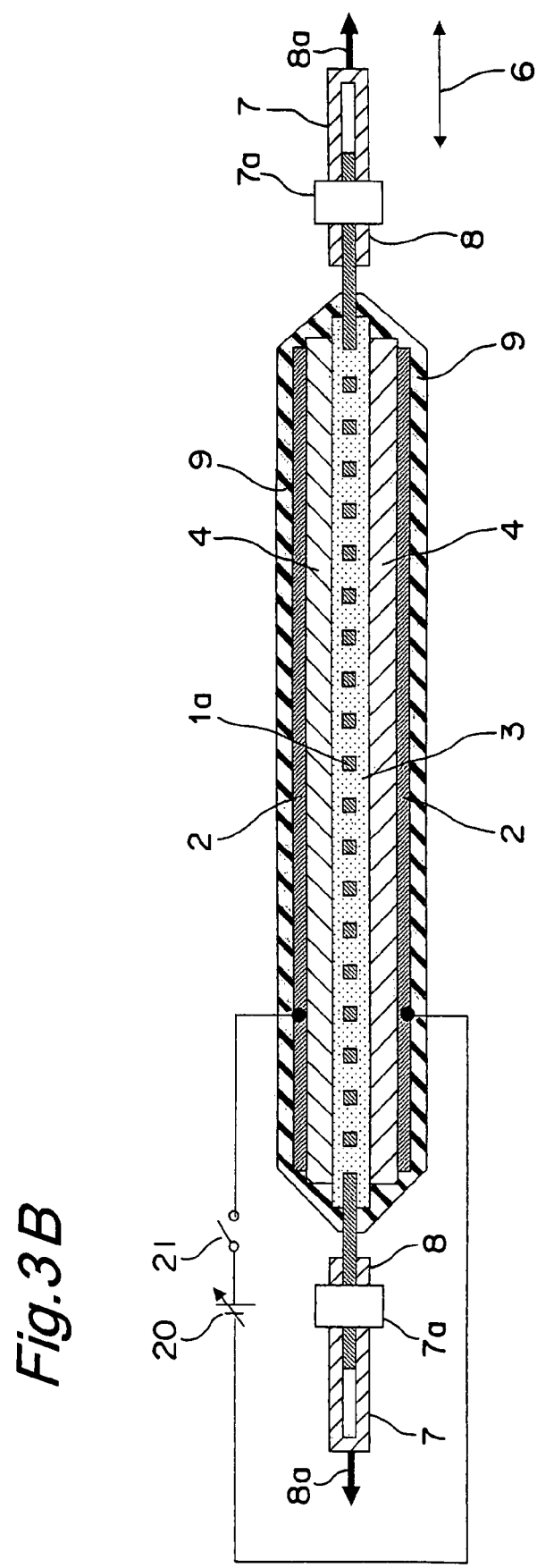
FIG. 3B is a cross-sectional view for showing an actuator that is given as a comparative example of the present invention, which is the actuator in the first embodiment of the present invention from which its holding member is omitted.

FIGS. 3A and 3B are a plane view and a cross-sectional view of an actuator without the holding member 5a. FIGS. 4A and 4B are deformation views that indicate the results of analytic calculations carried out on the actuator having the structure shown in FIGS. 3A and 3B. For use in comparison, FIG. 4A indicates the results of calculations carried out on only the active member layer 3 in which the flexible electrode 1a is embedded. In other words, this case corresponds to a structure in which the actuator of this type (without the holding member 5a) is allowed to expand and contract by applying a voltage between it and opposing electrodes in an electrolytic solution, and in this case, the constituent elements other than the active member layer 3 do not interfere with the expansion and contraction of the active member layer 3. In contrast, FIG. 4B indicates a calculation model which, in addition to these, includes the electrolytic layer 4 and the second electrode layer 2.

The dimension of an active member layer of the calculation model is 6 mm in width, 24 mm in length and 20 μm in thickness, and the material thereof is allowed to have a longitudinal elastic modulus (Young's modulus) of $0.003 \times 10^{12} N/m^2$ and a Poison's ratio of 0.3 on the assumption of using polypyrrole. With respect to the flexible electrodes, electrodes having a zig-zag pattern with a thickness of 10 μm, a line width of 100 μm and a pitch of 1 mm, as shown in FIG. 1A are embedded in this active member layer, and stainless steel SUS304 is used as the material thereof with a longitudinal elastic modulus of $0.178 \times 10^{12} N/m^2$ and a Poison's ratio of 0.3. In such a finite element calculation model, the calculating and analyzing operations are carried out on the assumption that the active member layer should be contracted in an isotropic manner in the in-plane directions. In the case of FIG. 4B, in addition to the above-mentioned structure, electrolytic layers having a thickness of 15 μm and electrode layers having a thickness of 15 μm are placed on both of the sides of the active member layer, and a polyelectrolytic gel having longitudinal elastic modulus of $0.3 MN/m^2$ and a Poison's ratio of 0.49 is used as the material for the electrolytic layer, and an aluminum foil having a longitudinal elastic modulus of $0.067 \times 10^{12} N/m^2$ and a Poison's ratio of 0.3 is used as the material for the electrodes. With respect to the polyelectrolytic gel, for example, a gel, prepared through processes in which ethylene glycol-dimethacrylate (EDGMA) serving as a crosslinking agent was added to a solution having a mole ratio of 1:1 between ethylmethyl imidazolium-trifluoromethane sulfonyl imide (EMI.TFSI) serving as an ionic liquid and methylmethacrylate (MMA) serving as a monomer and the resulting solution is heated and polymerized, may be used. This polyelectrolytic gel is a solid-state polymer having an ionic conductivity, in which PMMA serving as a network polymer even after the polymerization and the ionic liquid are compatibly dissolved uniformly. The above-mentioned longitudinal elastic modulus is given as the actual measured value of this polyelectrolytic gel.

The electrolytic gel used as the above-mentioned electrolytic layer has low rigidity of 1/10,000 of the longitudinal elastic modulus of $3 GN/m^2$ of the active member layer (polypyrrole) that is an actual measured value of the sheet formed through the gelation of the ionic liquid; nevertheless, the results of the calculations indicate that in comparison with the generated displacement (δ=1) in the case when none of these layers are formed, the generated displacement is in a small level of 8.7% (δ=0.087) to indicate that these layers greatly interfere with the expansion and contraction of the active member layer.

Here, with respect to the dimension of the constituent elements of the present invention, for example, a flat-plate thin-type actuator is preferably formed by using a film thickness of 80 μm or less of the conductive polymer layer and a thickness in a range of from 5 to 50 μm of the electrode. The thickness of the electrode of less than 5 μm makes it difficult to exert functions as the supporting member, and the thickness exceeding 50 μm makes the rigidity too high to cause a difficulty in providing a generated displacement, failing to provide a preferable one. Moreover, the thickness of the conductive polymer layer exceeding 80 μm makes it difficult for ions that enter and leave the surface and back faces of the conductive polymer layer to reach the center portion of the film, with the result that the generated displacement becomes smaller and the operational speed becomes lower, failing to provide a preferable one. Here, more preferably, the flat-plate thin-type actuator is formed, with the thickness of the conductive polymer layer being set to 30 μm or less and the thickness of the electrodes being set in a range of from 5 to 10 μm.

Figure 5:
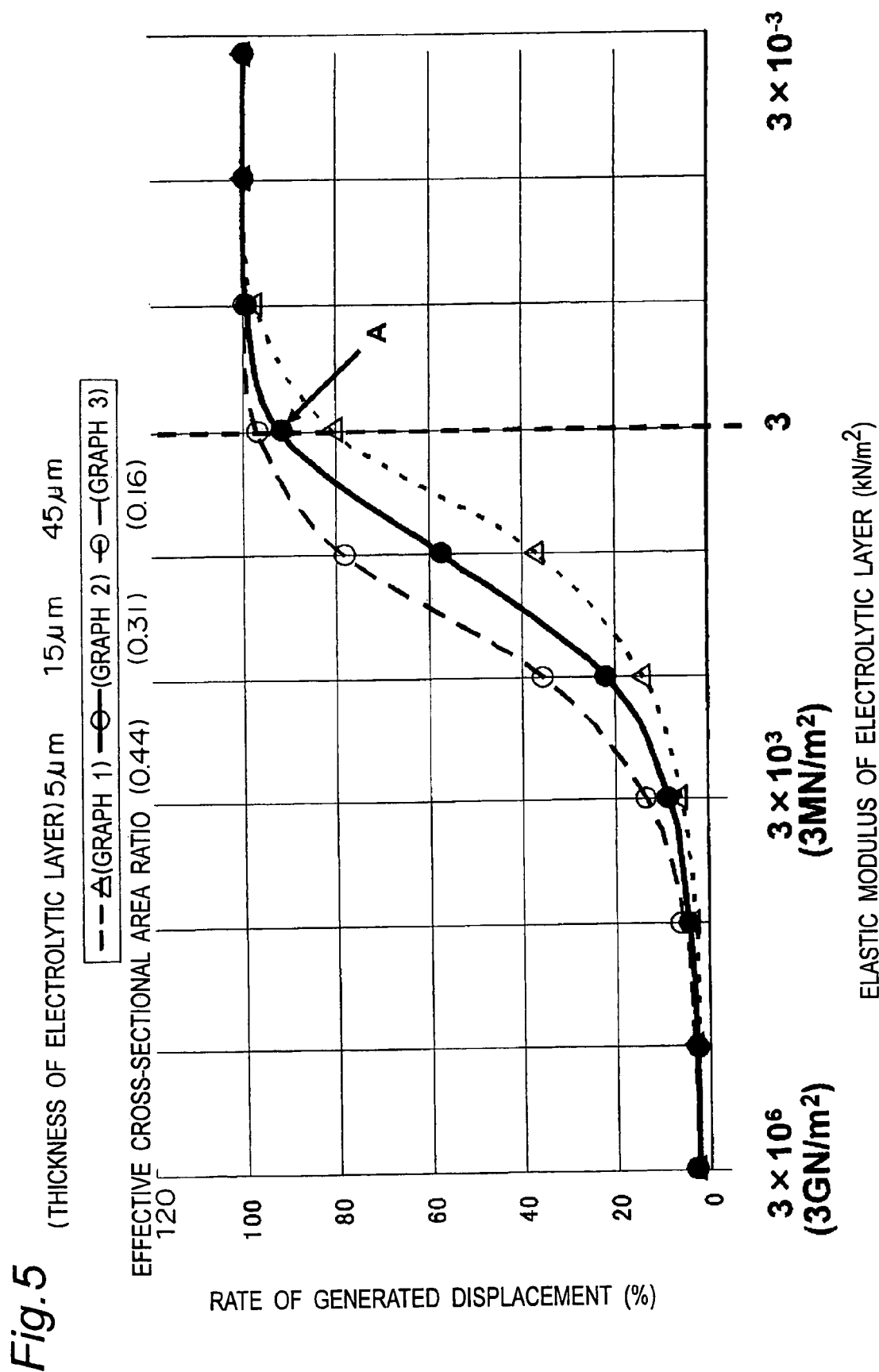
FIG. 5 is a graph that shows the results of analytic simulation carried out on the relationship between the generated displacement occurred in the active member layer and the elastic modulus of an electrolytic layer that relate to the actuator in accordance with the first embodiment of the present invention.

FIG. 5 is a graph in which, in the case when, with respect to the above-mentioned dimension and material composition of the actuator, the thickness of the electrolytic layer is changed into each of three different values (5 μm, 15 μm and 45 μm), with the elastic modulus of the electrolytic layer being changed in a wide range, the ratio of the generated displacement is shown. In FIG. 5, a limit value, $3 kN/m^2$, is clearly indicated by a dot line, with both of the thickness of the electrolytic layer and the effective cross-sectional area ratio being indicated as parameters. Here, the ratio of the generated displacement plotted on the axis of ordinate in FIG. 5, indicates a ratio at which the generated displacement becomes smaller due to the interference with the expansion and contraction of the active member layer caused by the electrolytic layer located adjacent to the active member layer, with the generated displacement in the case of no factors interfering with the expansion and contraction of the active member layer having no electrolytic layer being defined as 100%. The results of the analytic simulations indicate that when the rigidity of the electrolytic layer becomes not more than a certain critical value ($3 kN/m^2$), the interference with the generated displacement becomes drastically smaller.

In FIG. 5, those derived from the electrolytic layer with a thickness of 5 μm are indicated by a graph represented by triangular marks (graph 1 with a small dot line on the lowermost side), those derived from the layer with a thickness of 15 μm are indicated by a graph represented by black round marks (graph 2 with a solid line in the middle), and those derived from the layer with a thickness of 45 μm are indicated by a graph represented by white round marks (graph 3 with a large dot line on the uppermost side).

As the thickness of the electrolytic layer becomes larger, the ratio of the generated displacement becomes greater; however, since only the active member layer contributes to the expanding and contracting operations as the actuator, and since the electrolytic layer does not contribute to the expanding and contracting operations, having a greater thickness in the electrolytic layer is not preferable from this point of view.

FIG. 15 shows a cross-sectional view used for explaining the ratio of the effective cross-sectional area of the active member layer that contributes to the expanding and contracting operations as the actuator. FIG. 15 shows a basic unit portion of repetitions drawn from the lamination-type actuator shown in FIG. 13B, which will be described later. Here, since the second electrode layer (opposing electrode) 2 also serves as the electrodes of the adjacent layer, this basic unit includes only one layer.

The effective cross-sectional area ratio of the active member layer 3 is defined as follows:

(Effective cross-sectional area ratio)=$a/(a+2b+c)$

Here, "a" indicates the thickness of the active member layer 3, "b" indicates the thickness of the electrolytic layer 4, and "c" indicates the thickness of the second electrode layer (opposing electrode) 2. For example, in this case, since the thickness of the active member layer 3 is set to 20 μm, with the thickness of the second electrode layer (opposing electrode) 2 being set to 15 μm, the effective cross-sectional area ratio becomes 0.44 when the thickness of the electrolytic layer 4 is 5 μm (in the case of graph 1). In contrast, the effective cross-sectional area ratio becomes 0.31 when the thickness of the electrolytic layer 4 is 15 μm (in the case of graph 2), and the effective cross-sectional area ratio becomes 0.16 when the thickness of the electrolytic layer 4 is 45 μm (in the case of graph 3).

With respect to the active member layer 3, the minimum limit of the film thickness of polypyrrole of the above-mentioned conductive polymer is set to 5 μm or more from the viewpoint of mechanical strength, and in the case of a thickness of 5 μm of the electrolytic layer that is equivalent to the above-mentioned thickness, this thickness is considered to be the minimum limit as the thickness of the electrolytic layer serving as a supply source used for supplying sufficient ions to the active member layer. It is confirmed that in order to restrain the interference with the generated displacement to 20% or less even under such a condition, the elastic modulus of the electrolytic layer needs to be set to 3 kN/m² or less. Under this condition of the electrolytic layer, the thickness of the electrolytic layer is more preferably set to 15 μm since this thickness makes it possible to restrain the interference with the generated displacement to 10% or less.

Moreover, in the case of the thickness of the electrolytic layer of 45 μm, although the electrolytic layer having a larger thickness is more preferable since the interference with the generated displacement is further restrained to 3% or less; however, in contrast, since the increased thickness decreases the cross-sectional area ratio of the active member layer relating to the expanding and contracting operations as the actuator, the increase in the thickness needs to be limited.

Therefore, with respect to the thickness of the electrolytic layer in the above-mentioned dimension and material composition of the actuator, it is confirmed that by setting the thickness thereof, for example, to at least in a range of from 5 μm to 45 μm with the elastic modulus of the electrolytic layer 4 being set to 3 kN/m² or less, the interference with the expanding and contracting operations of the active member layer 3 can be restrained to 20% or less. With this arrangement, it becomes possible to increase the effective cross-sectional area of the active member layer without interfering with the expansion and contraction of the active member layer.

The above-mentioned analytic simulations have been carried out on an actuator model having specific width and length, and since it is considered that the ratio at which the generated displacement becomes smaller due to interference with the expansion and contraction of the active member layer are normalized values that are hardly affected by these dimensions. To make sure of it, by using a model in which the width is doubled as well as a model in which the length is doubled, it is also confirmed that the graph shown in FIG. 5 is effective within a range of possible error. Therefore, the thickness of the electrolytic layer is most important among the dimension factors of the actuator. In the above-mentioned analytic simulations, the thickness of the active member layer is set to 20 μm as a representative value; however, in the case when with respect to a sample corresponding to point A in FIG. 5 in the vicinity of the critical value of the ratio of the generated displacement, the value of the thickness of this active member layer is set to 10 μm, the ratio of the generated displacement becomes 43% in the case of 10 μm in the thickness of the active member layer, while the ratio of the generated displacement is 92% in the case of 20 μm in the thickness of the active member layer. Therefore, upon making the active member layer thinner, in order to prevent the ratio of the generated displacement from deteriorating, the elastic modulus of the electrolytic layer needs to be made smaller so that it is confirmed that the condition of an elastic modulus of 3 kN/M² or less is an essentially required condition. It is confirmed that, within the actual thickness range of the active member layer, the influence of the elastic modulus of the electrolytic layer adjacent to the active member layer is critical.

The conditions of the electrolytic layer found as described above can also be applied to materials other than the material in the above-mentioned example, because its rigidity can be adjusted, for example, by changing the mixing ratio of the monomer and the ionic liquid upon gelation.

Here, the longitudinal elastic modulus of 3 kN/m² in the electrolytic layer 4 is an extremely low level of rigidity, that is, 1/1,000,000 of the longitudinal elastic modulus of the active member layer (polypyrrole) 3. With respect to the material having such an elastic modulus of 3 kN/m² or less, for example, polyvinyl chloride (PVC) based gel materials are listed, although these are not electrolytes. By adjusting the amount of a solvent to be used upon gelation, a polymer gel having such a low longitudinal elastic modulus can be obtained. In the case of a lump of a PVC gel material having an actual measured value of 0.9 kN/m² in its longitudinal elastic modulus within a range of an applied small stress up to about 1 kN/m², it only exerts its strength like that of paste, and can be easily scooped up with a spoon. Therefore, it is difficult to maintain the strength of the actuator by using the material of this type.

Figures 6A, 6B:
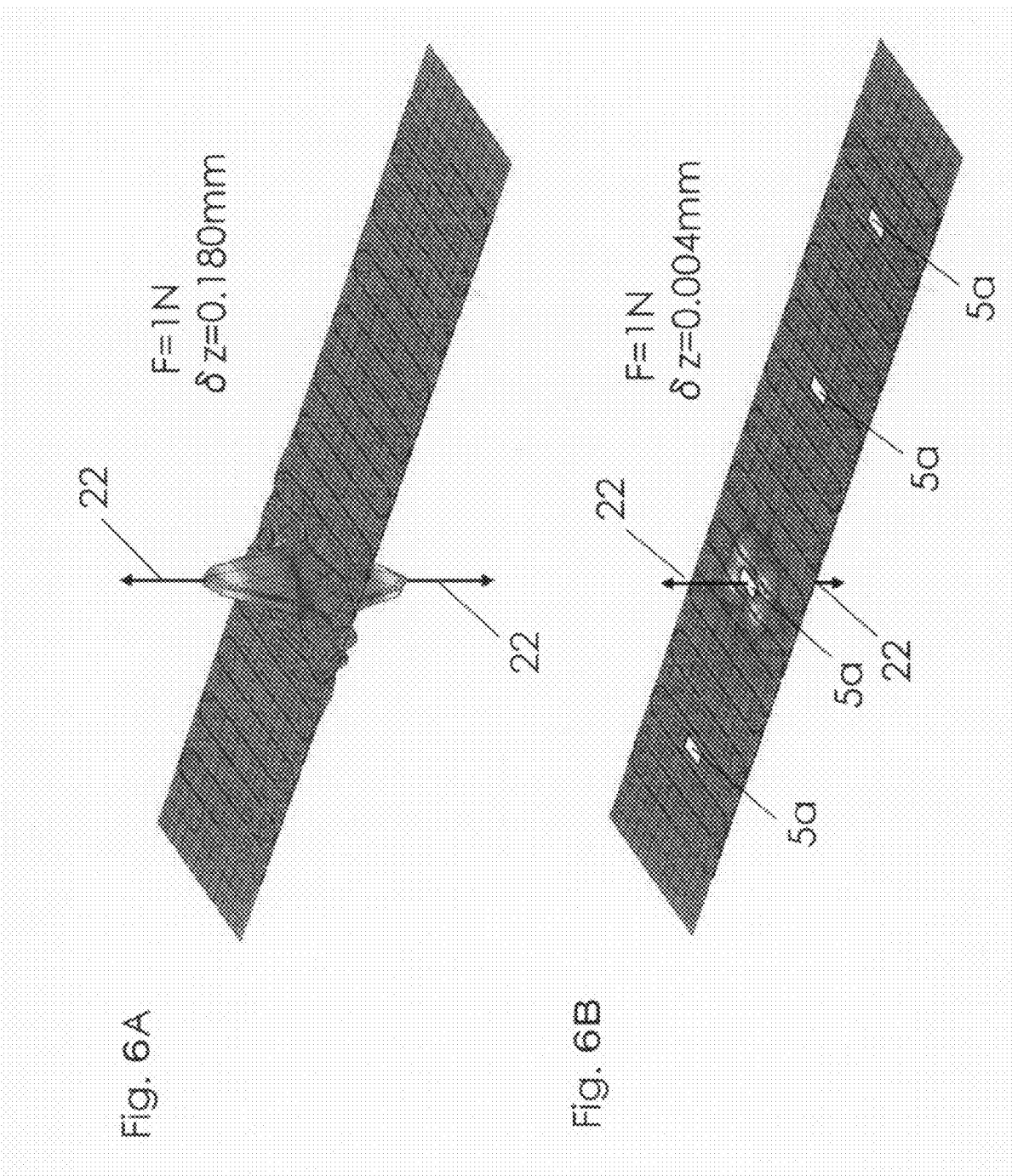
FIG. 6A is a deformation view that indicates the results of analytic simulation carried out on a state in which an external force is exerted on an actuator that corresponds to the actuator from which the holding member for maintaining the thickness is omitted of the first embodiment of the present invention.
FIG. 6B is a deformation view that indicates the results of analytic simulation carried out on a state in which an external force is exerted on an actuator that corresponds to the actuator on which the holding members for maintaining the thickness are provided of the first embodiment of the present invention.

In FIGS. 6A and 6B, it is supposed that the elastic modulus of the electrolytic layer 4 is 0.3 kN/m², and in the case when peeling forces 22 are exerted in a direction orthogonal to the longitudinal direction and the width direction of the actuator, deformations in the actuator are shown so as to be compared, depending on the presence and absence of the holding members 5a in the first embodiment. A polymer electrolytic gel, polymerized by using the aforementioned EMI.TFSI serving as an ionic liquid and MMA, is used as the holding members 5a with a longitudinal elastic modulus of 0.3 MN/M², and the holding members 5a are formed into a rectangular shape of 1 mm in length×0.25 mm in width in its plane shape. The results of calculations show that in the absence of the holding members 5a, the deformation is 0.18 mm with respect to the peeling forces 22 of 1N, while the deformation is within 4 μm in the presence of the holding members 5a; therefore, it is indicated that even the holding members 5a having a low level of rigidity, that is, 1/10,000 in the longitudinal elastic modulus in comparison with the active member layer (polypyrrole) 3 having a longitudinal elastic modulus of 3 GN/m² are allowed to exert a reinforcing effect.

Here, the holding members 5a are placed to hold the thickness between the active member layer 3 and the second electrode layer 2 and consequently to maintain the strength of the actuator, and, for example, the holding members 5a may be simply made in contact with the active member layer 3 and the second electrode layer 2 respectively, as long as the holding members 5a are placed at its fixed position. Actually, the holding members 5a are fixed onto the second electrode layer 2, while they are simply made in contact with the active member layer 3, and this forms a desirable simple structure upon production. In FIG. 1A, each of the holding members 5a, which is prepared as a pillar-shaped insulating member having a rectangular parallelepiped shape with a rectangular shape in its plane, is placed at a position corresponding to the center portion of each gap between each patterned stripe 1a-1 in the width direction and each coupling portion 1a-2 of the flexible electrode 1a, and the holding members 5a are placed along the longitudinal direction of the flexible electrode 1a substantially uniformly (with substantially equal intervals), in one row symmetrically with respect to the center portion of the actuator, as well as in the same position in the thickness direction.

Figure 14A:
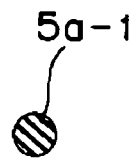
FIG. 14A is a view that shows one example of a plane shape of the holding member in the above-mentioned embodiment of the present invention.
Figure 14B:
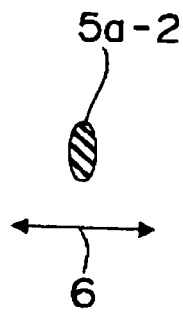
FIG. 14B is a view that shows another example of the plane shape of the holding member in the above-mentioned embodiment of the present invention.
Figure 14C:
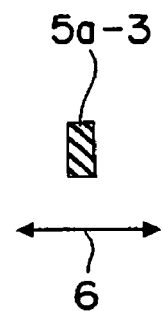
FIG. 14C is a view that shows a still another example of the plane shape of the holding member in the above-mentioned embodiment of the present invention.
Figure 14D:
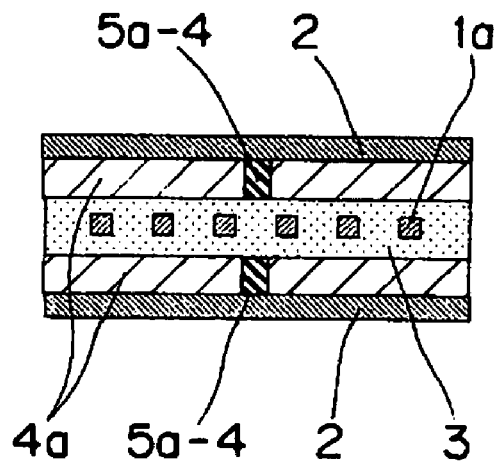
FIG. 14D is a view that shows one example of the cross-sectional shape of the holding member in the above-mentioned embodiment of the present invention.
Figure 14E:
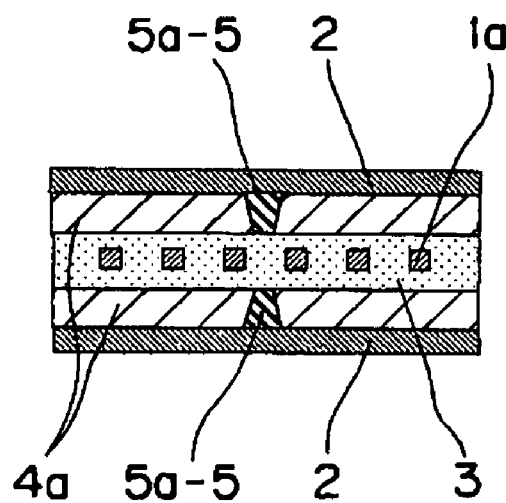
FIG. 14E is a view that shows another example of the cross-sectional shape of the holding member in the above-mentioned embodiment of the present invention.
Figure 14F:
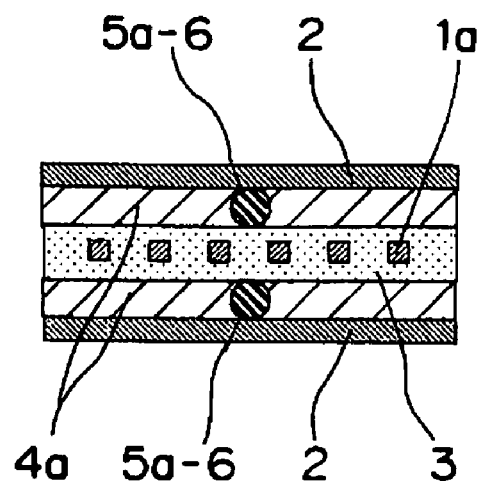
FIG. 14F is a view that shows a still another example of the cross-sectional shape of the holding member in the above-mentioned embodiment of the present invention.

FIGS. 14A to 14I show various plane shapes, cross-sectional shapes, and layouts of the holding members 5a. Here, the various plane shapes, cross-sectional shapes, and layouts of the holding members 5a are not intended to be limited to the first embodiment, and can be applied to all the embodiments of the present invention. In the case when the holding members 5a are applied by using a dispenser, dot-shaped holding members 5a-1 as shown in FIG. 14A or elliptical shaped holding members 5a-2 as shown in FIG. 14B can be formed. In the case when the holding members 5a-2 are formed into a thin elongated elliptical shaped pattern as shown in FIG. 14B, those members are preferably disposed with the longitudinal direction being aligned with the direction orthogonal to the expanding and contracting directions 6 so as not to interfere with the expansion and contraction of the active member layer 3 in the expanding and contracting directions 6. In the same manner, when holding members 5a-3 each having a rectangular-shaped pattern as shown in FIG. 1A are formed, those members are preferably disposed, with the long side thereof being aligned with the direction orthogonal to the expanding and contracting directions 6. Other than the pillar shape as shown in FIG. 14D, with respect to each cross-sectional shape of the holding members 5a-4, it may be formed into a trapezoidal cross-sectional shape or a cone-shaped cross-sectional shape as shown in holding members 5a-5 in which the cross-sectional area on the second electrode layer side is larger than the cross-sectional shape on the other side as shown in FIG. 14E so that the contact area to the active member layer 3 through which ions enter and leave can be preferably made smaller or the adhesive strength to the second electrode layer 2 can be preferably increased on the bottom face side of the trapezoidal shape. Moreover, as shown in FIG. 14F, spherical beads may be prepared as holding members 5a-6.

Figure 14G:
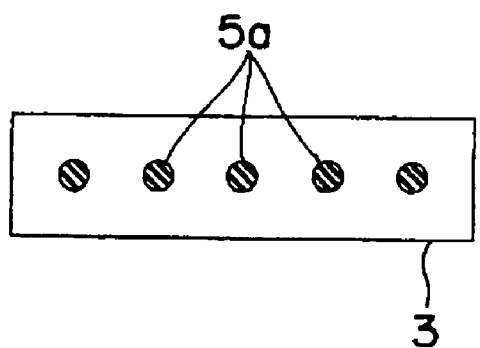
FIG. 14G is a view that shows one example of a layout of the holding member in the above-mentioned embodiment of the present invention.
Figure 14H:
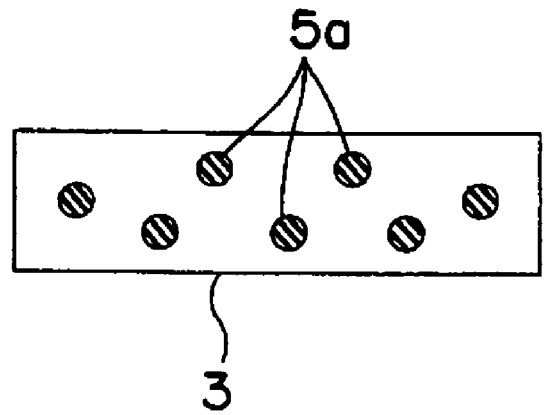
FIG. 14H is a view that shows another example of the layout of the holding member in the above-mentioned embodiment of the present invention.
Figure 14:
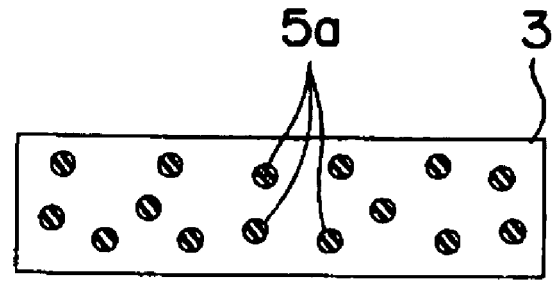
FIG. 14I is a view that shows a still another example of the layout of the holding member in the above-mentioned embodiment of the present invention.

Moreover, FIGS. 14G to 14I show examples of the holding members 5a, and FIG. 14G shows a structure in which those are disposed in one row with substantially equal intervals in the center portion of the active member layer 3 as indicated by the above-mentioned layout. FIG. 14H shows a structure in which the holding members 5a are disposed in a zig-zag pattern so that the peripheral portion of the stripe-shaped actuator can be reinforced. The layout of FIG. 14I corresponds to, for example, a structure in which beads to form spacers are dispersed as the holding members 5a, which are randomly placed in this example. With respect to the reinforcing effect, in FIGS. 14H and 14I, those members are placed at the same positions in the thickness direction most preferably.

Moreover, in order to seal the electrolytic layer 4 adjacent to the active member layer 3 between the two electrode layers 1 and 2, it is preferable to cover the entire portion except for the force action portion 8 by a sealing member 9 that is flexible so as not to interfere with the action of the force action portion 8. The sealing member 9 makes it possible to prevent moisture from entering the electrolytic layer 4 and also to prevent damages due to externally applied forces, and maintains the strength properly. With respect to the sealing member 9, for example, soft silicone-based rubber having a longitudinal elastic modulus of about 100 kN/m$^2$ is preferably used so as not to further interfere with the expansion and contraction of the active member layer 3.

The first embodiment has discussed the structure in which the conductive active member layer provided with the flexible electrode 1a separately is used as the first electrode layer; however, since the active member layer of the present invention in itself serves as a conductive material, the polymer actuator of the present invention is allowed to provide operations as the actuator in the same manner even in a structure in which the conductive active member layer, which also serves as electrodes itself, is used as the first electrode layer, without separately forming the electrode 1a, and this structure does not interfere with the constituent requirements of the present invention. In the case of a conductive active member layer having a high conductivity, without the necessity of forming the flexible electrode 1a, the same effects as those explained above except for those effects inherent to the flexible electrode can be achieved. In the case of a conductive active member layer whose conductivity is not necessarily high, it is preferable to separately install the electrode 1a as in the case of the first embodiment, and in this case, a voltage can be uniformly applied to the active member layer instantaneously in comparison with the structure without the flexible electrode 1a as described above so that peculiar effects, such as generation of entering and leaving ions at high speeds and high-speed expansion and contraction of the active member layer, can be obtained, thereby making it possible to provide a further preferably structure.

In accordance with the first embodiment of the present invention, the plane thin-type polymer actuator, which is provided with the conductive active member layer 3 in which the flexible electrode 1a is embedded is prepared as the first electrode layer 1, and the second electrode layer 2 that is placed apart from the active member layer 3 of the first electrode layer 1 so as to be made face to face therewith, with the electrolytic layer 4 made in contact with at least the active member layer 3 being sealed between the two electrode layers 1 and 2, so that by applying an electric field between the two electrodes 1 and 2, anions and/or cations are allowed to enter and leave the active member layer 3 from the electrolytic layer 4 so as to expand and contract the active member layer 3, is provided, and in this structure, the electrolytic layer 4 is a solid-state electrolyte having an elastic modulus of 3 kN/m$^2$ or less, and the holding members 5a that maintain the thickness between the active member layer 3 and the second electrode layer 2 are also installed.

With this structure, the electrolytic layer 4 is made from a solid-state electrolyte having an elastic modulus of 3 kN/m$^2$ or less so as not to interfere with the expanding and contracting operations of the active member layer 3, and since the electrolytic layer 4 in itself does not have sufficient strength, the holding members 5a inside the electrolytic layer 4 are allowed to maintain the gap (thickness) between the active member layer 3 and the second electrode layer 2 so that the interlayer separation can be prevented.

With this arrangement, the polymer actuator in accordance with the first embodiment can be applied to a driving source for apparatuses such as robots that are expected to be actively operated closely to people for jobs, such as house chores and work assist jobs as well as nursing assist jobs for the aged and physically-challenged person in homes, offices, and hospitals, as an actuator whose driving source is small-sized, light weight and flexible, and used safely. With respect to the actuator whose driving source is small-sized, light weight and flexible, and used safely, since the polymer actuator in accordance with the first embodiment uses a polymer base material that is capable of generating a great force, allows high-speed operations, and is easily manufactured and in particular, highly resistant to deformation, the resulting actuator can be operated in the air.

Second Embodiment

The following description will discuss a mode in which the electrolytic layer 4 is constituted by two electrolytic layers 4a and 4b as a polymer actuator in accordance with a second embodiment of the present invention.

FIGS. 7A and 7B are a plane view and a cross-sectional view that show an actuator in accordance with one mode of the second embodiment of the present invention. In this actuator, the electrolytic layer 4 is constituted by a first electrolytic layer 4a made in contact with the active member layer 3 and a second solid-state electrolytic layer 4b that is made in contact with the first electrolytic layer 4a and the second electrode 2. The other constituent elements are the same as those described in FIGS. 1A and 1B, and the operations of the actuator are also the same as those described therein. With respect to the holding members 5a used for holding the thickness between the active member layer 3 and the second electrode 2, in the second embodiment, the active member layer 3 and the second solid-state electrolytic layer 4b are coupled with each other by using the holding members 5a placed inside the first electrolytic layer 4a. In accordance with the above-mentioned analytic simulations, the rigidity of the first electrolytic layer 4a needs to be set to an extremely low level, that is, to a state close to liquid. From the viewpoint of not interfering with the expansion and contraction of the active member layer 3, the first electrolytic layer 4a is preferably prepared as a liquid-state electrolyte. In this case, it is preferably formed into a lubricating layer made as thin as possible, which has, for example, a thickness within several μms, and is allowed to hold itself through surface tension. Here, since ions in a required quantity are needed in order to expand and contract the active member layer 3, there is a limitation in reducing the layer thickness of the electrolytic layer 4. For example, in the case of an electric double layered capacitor, the thickness of the electrolytic layer 4 is maintained at least to several tens of μms so as to ensure the quantity of ions required for charging. Therefore, it is preferable to form the electrolytic layer 4 by using the two electrolytic layers of 4a and 4b as in the case of the second embodiment. With this arrangement, the interference with the expansion and contraction of the active member layer 3 can be restrained to the minimum, and by ensuring the supply of ions from the electrolytic layers 4a and 4b to the active member layer 3, the active member layer 3 is allowed to carry out expanding and contracting operations in a sufficiently large level.

With respect to the first electrolytic layer 4a, for example, ethylmethyl imidazolium.trifluoromethane sulfonyl imide (EMI.TFSI) serving as an ionic liquid may be used. Moreover, with respect to the second solid-state electrolytic layer 4b, a polymer electrolytic gel, prepared through processes in which a crosslinking agent, ethylene glycol.dimethacrylate (EDGMA), is added to a solution having a mole ratio of 1:1 between the same (EMI.TFSI) serving as an ionic liquid and methylmethacrylate (MMA) serving as a monomer and the resulting solution is heated and polymerized, may be used. The latter polymer electrolytic gel is the same as that described in FIGS. 3A and 3B of the first embodiment.

Figure 8A:
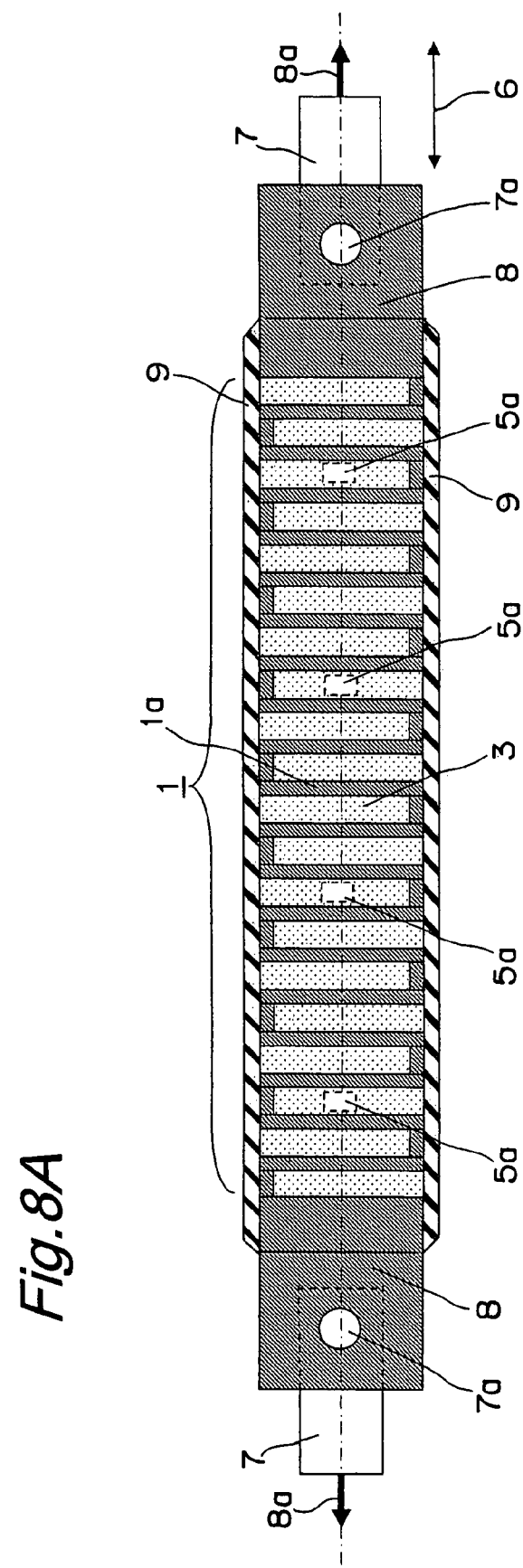
FIG. 8A is a plane view that shows an actuator in accordance with another mode of a second embodiment of the present invention.

Next, FIGS. 8A and 8B are a plane view and a cross-sectional view that show an actuator in accordance with another mode in the second embodiment of the present invention. In this actuator, the electrolytic layer 4 is constituted by a first electrolytic layer 4a made in contact with the active member layer 3 and a second solid-state electrolytic layer 4b that is made in contact with the first electrolytic layer 4a and the second electrode 2, with the second solid-state electrolytic layer 4b and the holding members 5a being integrally formed as a solid-state electrolyte. In this mode, since the holding members 5a correspond to protrusions 4c formed on the second solid-state electrolytic layer 4b, such members serving as the protrusions used for allowing the holding members 5a to be integrally formed with the second solid-state electrolytic layer 4b can be easily formed through a molding method. The above-mentioned process used for gelling the ionic liquid EMI.TFSI into a sheet shape by using MMA is normally carried out by the molding method. In other words, for example, between two sandwiching plates or sheets such as glass plates or sheets made from polyethylene terephthalate (PET), spacers that are made from, for example, Teflon (registered trademark) and correspond to the thickness of a sheet to be manufactured are interposed, and a mixed solution of EMI.TFSI, MMA, and a cross-linking agent is poured into the gap so that by heating this so as to be polymerized, a polymer is formed. Thereafter, by separating this, a polymer electrolytic gel sheet can be obtained. By preliminarily forming recessed portions in the sandwiching plates or sheets, such as glass plates or PET sheets to be used in this process, through etching processes or pressing processes, these portions are automatically formed into protrusions corresponding the holding members 5a. By using this method, the production is easily carried out, and since the holding members 5a themselves are made from an electrolyte, a particular effect is obtained in that even portions coupled by the holding members 5a of the active member layer 3 allow ions to enter and leave. Moreover, since the positions of the holding members 5a are determined at the positions of the recesses formed in the sandwiching plates or sheets preliminarily prepared, it is possible to provide superior positional precision and reproducibility in production.

The above-mentioned manufacturing process by the molding method has been explained as the process used upon manufacturing a polymer electrolytic gel sheet single body; however, for example, in the case when the same structure as the flexible electrode 1a having a zig-zag pattern separately formed on the first electrode layer 1 is prepared as the second electrodes (opposing electrodes) 2, a polymer electrolytic gel sheet may be directly formed on the opposing electrodes 2 in the following manner. In other words, with this opposing electrode 2 being made in contact with one of the sandwiching plates or sheets, the other sandwiching plate or sheet having recesses formed therein is held face to face therewith with spacers made from Teflon (registered trademark) interpolated therebetween, and a mixed solution of EMI.TFSI, MMA, and a cross-linking agent is poured into the gap so that by heating this so as to be polymerized, a polymer is formed. Thereafter, this is separated so that a member in which a polymer electrolytic gel sheet with the holding members 5a is formed on the opposing electrode 2 is obtained.

The active member layer 3 with flexible electrode 1a having a zig-zag pattern can be manufactured through the following processes. In other words, with the flexible electrode 1a having a zig-zag pattern, made of stainless steel, being made in contact with an electrode plate having a flat shape, such as a platinum plate or a glassy carbon plate, this structure is electrolytic polymerized in, for example, an electrolytic solution prepared by adding a pyrrole monomer in a propylene carbonate (PC) solution of tetrabutyl ammonium phosphoric acid hexafluoride ($TBA.PF_6$) so that polypyrrole is electrolytic-deposited on the flexible electrodes. This is separated from the flat shaped electrode so that the active member layer 3 with the flexible electrode 1a having a zig-zag pattern can be obtained.

With the above-mentioned two composite members being combined, by injecting EMI.TFSI serving as an ionic liquid thereto as the first electrolytic layer 4a, it is possible to manufacture an actuator having a structure shown in the cross-sectional view of FIG. 8B.

Figure 9B:
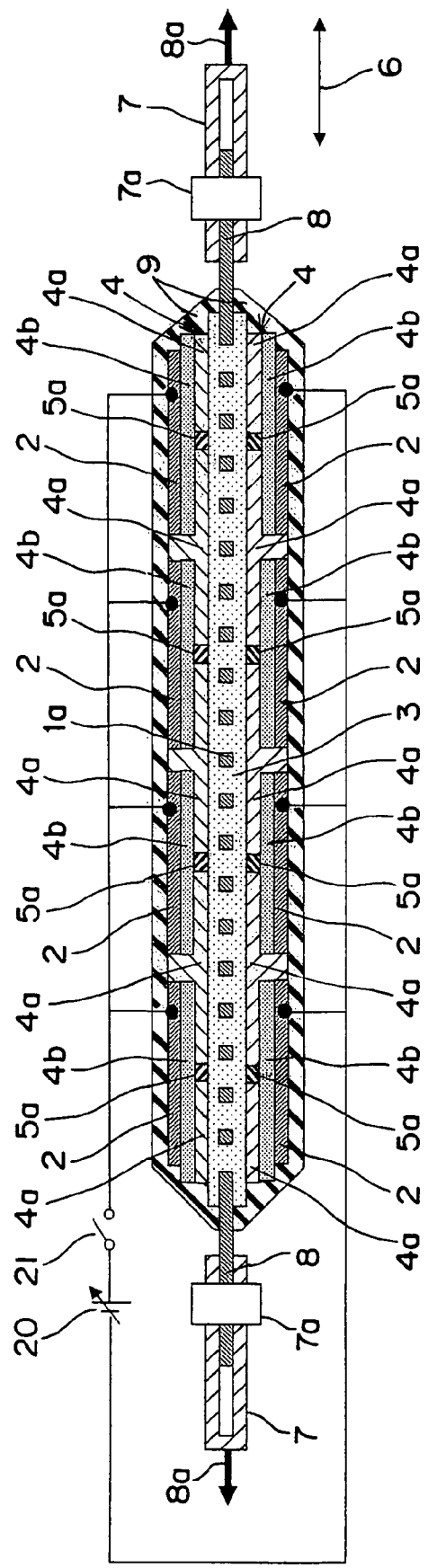
FIG. 9B is a cross-sectional view of the actuator in accordance with the still another mode of the second embodiment of the present invention.

Next, FIGS. 9A and 9B are a plane view and a cross-sectional view that show an actuator in accordance with another mode of the second embodiment of the present invention. In this actuator, the electrolytic layer 4 is constituted by a first electrolytic layer 4a having a low shearing force that is made in contact with substantially the entire face of the active member layer 3 and also partially made in contact with a sealing member 9 placed as the outermost layer and a second solid-state electrolytic layer 4b that is made in contact with the first electrolytic layer 4a and the second electrode 2, and in this structure, the second electrode 2 and the second solid-state electrolytic layer 4b are divided into a plurality of portions in the driving direction 6 of the actuator (in FIG. 9B, for example, divided into four portions). In order to examine the effects of this mode, analytic simulations by the use of the finite element method are carried out on the deformation of the actuator having the structure shown in FIGS. 9A and 9B. The results are shown in FIGS. 10A and 10B. FIG. 10A shows a structure in which the second electrode 2 and the second solid-state electrolytic layer 4b, which are not divided into portions, are coupled with each other at four portions by using holding members 5a, each having a rectangular shape of 1 mm in length×0.25 mm in width in its plane shape. In contrast, FIG. 10B shows a structure in which the second electrode 2 and the second solid-state electrolytic layer 4b, which have been divided into four portions, are coupled with each other at four portions by using holding members 5a, each having a rectangular shape of 1 mm in length×0.25 mm in width in its plane shape in the same manner. The material constants which are calculation premise values are set to the same as those of the analytic simulations of FIG. 4. When no electrode divisions are made as shown in FIG. 10A, the generated displacement is calculated as 59.6% in comparison with the structure with no constraint, indicating that the holding members 5a themselves interfere with the expansion and contraction of the active member layer 3. In contrast, when electrode divisions are made as shown in FIG. 10B, the generated displacement is calculated as 99.8% in comparison with the structure with no constraint, indicating that even when the holding members 5a are used for coupling, the holding members 5a hardly interfere with the expansion and contraction of the active member layer 3. The above description has discussed a case in which the number of divisions is 4, the number of connecting positions is 4 and each of the holding members 5a has a rectangular shape of 1 mm in length×0.25 mm in width in its plane shape, and such comparatively equal divisions of this type are preferably used so as to prevent a local constraint from occurring on the expansion and contraction of the active member layer 3.

Since the analytic simulations are carried out on the assumption that a flat-shaped aluminum foil having a thickness of 15 μm is to be used as the second electrodes 2, a great constraint effect is exerted by the holding members shown in FIG. 10A; however, in the case when the flexible electrode that is the same as the zig-zag patterned flexible electrode 1a embedded in the active member layer 3 is used as the second electrodes, such a constraint effect can be avoided. However, since these flexible electrodes have a small opposing area, it is more preferable to use electrodes having a flat shape as the second electrodes. In order to increase the surface area of the electrodes, an attempt has been made in which: an aluminum foil is used as a collector electrode for a capacitor and a battery, and carbon-based powder such as activated carbon is deposited on the surface thereof; and the electrodes of this type may be used as the second electrodes 2 in the second embodiment.

In the aforementioned embodiments as well as in embodiments to be described later of the present invention, a material, prepared by forming an ionic liquid consisting of anions and cations into gel, is used for the first electrolytic layer 4a so as to make its rigidity smaller than the rigidity of the second solid-state electrolyte 4b so that a totally solidified actuator capable of being operated in the air can be prepared, and the adverse effect of constraining the generated displacement of the active member layer 3 can be preferably reduced.

Moreover, by using an ionic liquid consisting of anions and cations as the first electrolytic layer 4a, it is possible to provide a semi-solidified actuator capable of being operated in the air, and also to further reduce the adverse effect of constraining the generated displacement of the active member layer 3. The ionic liquid is also referred to as a normal-temperature melting salt, and a well-known salt (NaCl) is an ionic bonding solid material made from $Na^+$ ions and $Cl^-$ ions, while this forms an ionic bonding salt that is a liquid at normal temperature. This ionic liquid has a superior property, that is, a non-volatile property, derived from the ionic bond in its bonding state. Therefore, even if the ionic liquid is in a liquid state, the ionic liquid is free from issues such as short life due to evaporation as seen in the aqueous-solution-based electrolyte and organic-solvent-based electrolyte, and the aforementioned embodiments and embodiments to be described later of the present invention make it possible to provide actuators capable of being operated in the air.

Moreover, by preparing the holding members 5a by using a matter prepared by solidifying an ionic liquid, it becomes possible to allow ions to enter and leave through of the coupling portions of the active member layer 3, and consequently to effectively expand and contract the active member layer 3.

Furthermore, by providing the structure in which a force action portion 8 for the actuator is connected to each of the two ends of the active member layer 3 in the actuator driving direction, it becomes possible to efficiently exert a displacement in expansion and contraction of the active member layer 3 and also to take out a generated force thereof.

Moreover, by covering the entire faces on upper and lower sides as well as right and left sides of the portions other than the force action portion 8 with a flexible sealing member 9 that does not disturb the movements of the force action portion 8, the electrolytic layer 4 made in contact with the active member layer 3 is sealed between the two electrode layers 1 and 2 so that it becomes possible to desirably prevent the electrolytic layer 4 from absorbing moisture and also to properly maintain the strength so as to prevent damages due to an external force. With respect to the sealing member 9, for example, soft silicone-based rubber having a longitudinal elastic modulus of about 100 kN/m² is preferably used, and lamination-type actuators relating to the aforementioned embodiments and embodiments to be described later are desirably used so as not to disturb the expansion and contraction of the active member layer 3.

Moreover, with respect to the active member layer 3, materials, such as an inherently conducting polymer, for example, polyaniline, polypyrrole or a π-conjugated polymer having a polythiophene matrix, or derivatives thereof, may be used. Furthermore, the active member layer 3 may be prepared as a conductive member containing at least a material selected from the group consisting of carbon-based fine particles, metal-based fine particles, metal-oxide fine particles, carbon nano-fibers, and carbon nano-tubes. By using such a material for the active member layer 3, anions and/or cations and/or electrons are allowed to enter and leave the active member layer 3 so that the active member layer 3 can be expanded and contracted. The rigidity of the active member layer of such a conductive-fine-particle dispersion type can be adjusted by selecting the polymerization conditions of a polymer forming a binder, for example, polyvinylidene fluoride. In order to provide a high generated force, the active member layer is preferably adjusted to have an elastic modulus of about 3 GN/m² close to the rigidity of polypyrrole that is the aforementioned conducting polymer. In this case, as shown in FIG. 5, the interference to the generated displacement becomes smaller when the rigidity of the electrolytic layer is kept below a certain critical value, in the same manner.

In accordance with the arrangement of the second embodiment, since the electrolytic layer 4 is constituted by the liquid-state first electrolytic layer 4a and the second solid-state electrolytic layer 4b having an elastic modulus of 3 kN/m² or less, the interference to the expansion and contraction of the active member layer 3 can be suppressed to the minimum, and by ensuring supplies of ions from the electrolytic layers 4a and 4b to the active member layer 3, the active member layer 3 is driven to carry out sufficiently large expanding and contracting operations, and since the electrolytic layer 4 in itself does not have a sufficient strength, the gap (thickness) between the active member layer 3 and the second electrode layer 2 is maintained by the holding members 5a inside the first electrolytic layer 4a so that the interlayer separation can be prevented.

Third Embodiment

The following description will discuss a structure in which a member of another mode different from the aforementioned modes is used as the holding member 5a that maintains the thickness between the active member layer 3 and the second electrode layer 2, with respect to the polymer actuator in accordance with a third embodiment of the present invention.

Figure 11A:
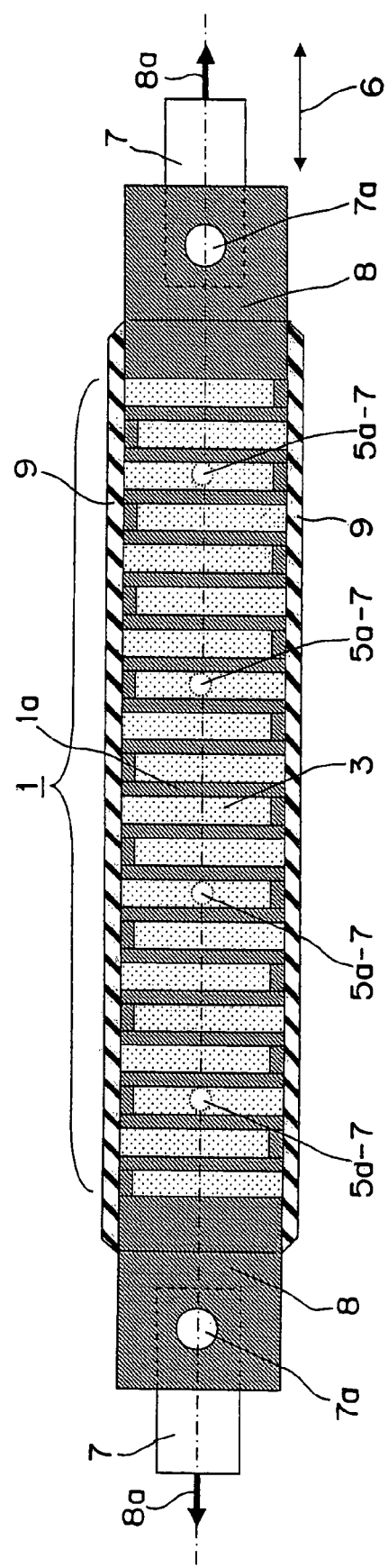
FIG. 11A is a plane view that shows an actuator in accordance with one mode of a third embodiment of the present invention.
Figure 11B:
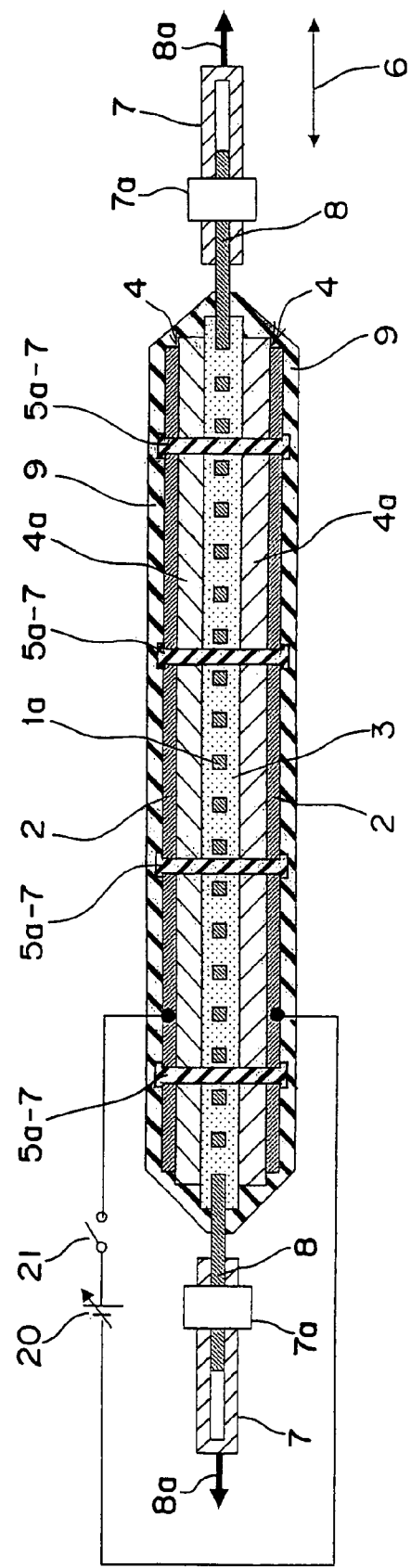
FIG. 11B is a cross-sectional view of the actuator in accordance with the one mode of the third embodiment of the present invention.

FIGS. 11A and 11B are a plane view and a cross-sectional view that show an actuator of one mode in accordance with the third embodiment of the preset invention. This actuator has a structure in which, with respect to holding members 5a-7 that maintain the thickness between the active member layer 3 and the second electrode layer 2, two second electrode layers 2, placed on the two sides of the active member layer 3, are coupled by the holding members 5a-7 that are allowed to penetrate gap portions between the active member layer 3 and the flexible electrode 1a. For example, insulating caulking pins, made from plastics, are used as the holding members 5a-7, and allowed to penetrate the respective layers so as to secure the layers; thus, the thickness between the electrode layers 1 and 2 is easily maintained. Moreover, these members are preferably used in combination with spacers or separators that are placed in the first electrolytic layer 4a and the like.

In the holding members 5a described in the first embodiment of the present invention, it is necessary to bond the active member layer 3 and the second electrode layer 2 to each other on the interface thereof so as to be coupled by the holding members 5a; however, this coupling method by the use of the holding members 5a-7 needs not to take such a bonding process, thereby making it possible to carry out the coupling process easily by using the holding members through a simpler method.

Figure 12A:
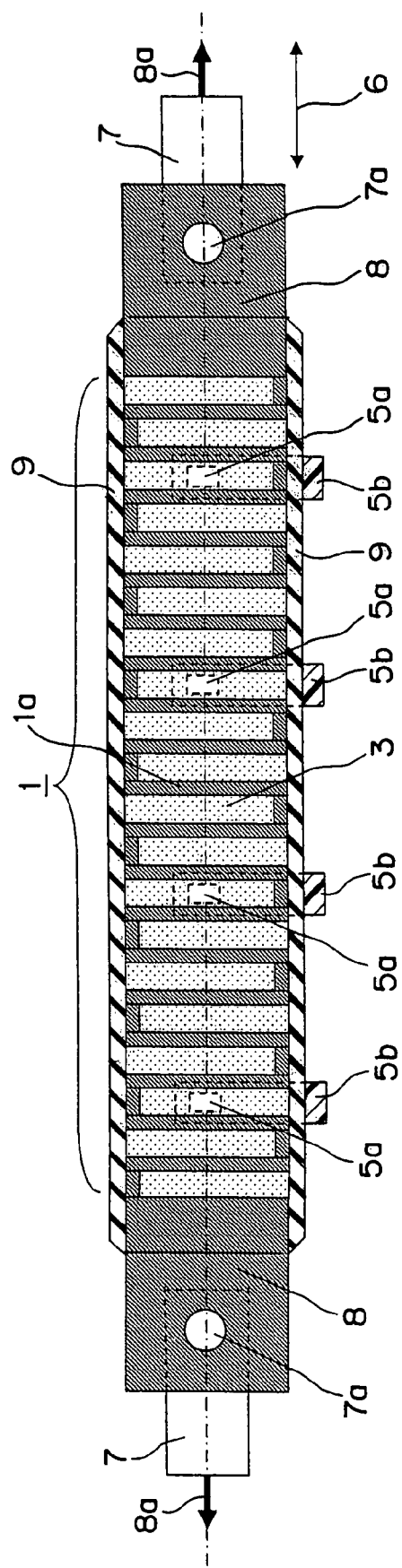
FIG. 12A is a plane view that shows an actuator in accordance with another mode of the third embodiment of the present invention.
Figure 12B:
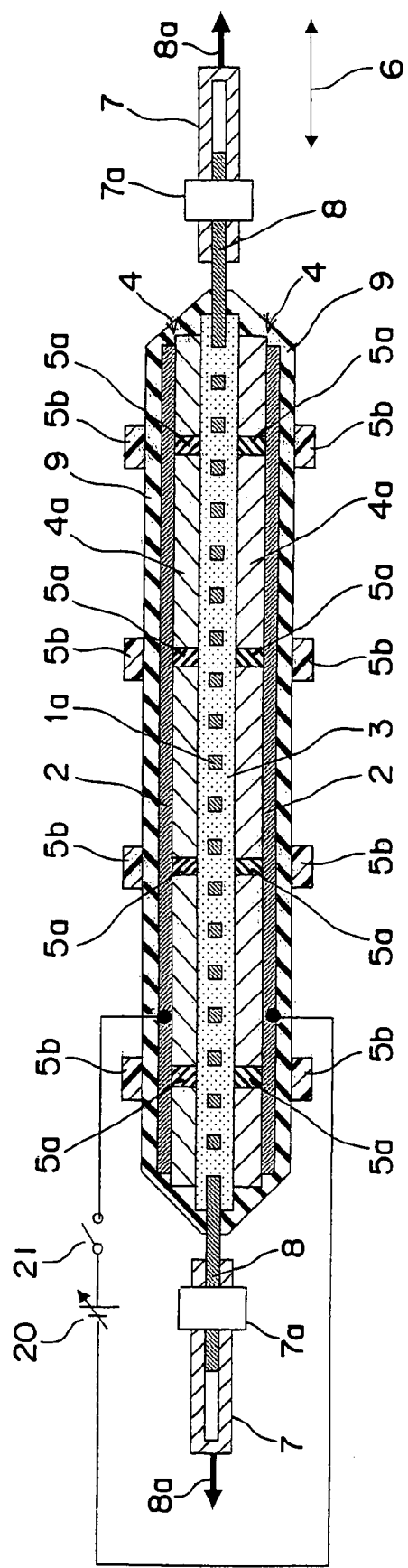
FIG. 12B is a cross-sectional view of the actuator in accordance with a still another mode of the third embodiment of the present invention.

FIGS. 12A and 12B are a plane view and a cross-sectional view that show an actuator of the other mode in accordance with the third embodiment of the preset invention. This actuator has a structure in which, with respect to holding members 5a that maintain the thickness between the active member layer 3 and the second electrode layer 2, the holding members 5a are inserted between the active member layer 3 and the second electrode layer 2, and the second electrode layer 2, the first electrolytic layer 4a, the active member layer 3, the first electrolytic layer 4a and the second electrode layer 2 are sandwiched by substantially U-letter shaped clips 5b laterally from outside. The present actuator has a plane thin shape; therefore, with respect to the clip 5b, for example, a member prepared by forming an insulating plastic plate into a clip shape is used, and the present actuator is sandwiched by this member so that the holding member 5a is easily pressed. The holding member 5a in itself has no need to have a bonding property, and may be prepared as spacers or separators. For example, in the case of spacers or the like made from Teflon (registered trademark), which exert little friction to the interface to the electrode material, these members are desirably used without interfering with the generated displacement of the active member layer 3.

In this method for coupling by using the holding member 5a and the clip 5b also, although it is necessary to bond the active member layer 3 and the second electrode layer 2 to each other on the interface thereof so as to be coupled by the holding members 5a in the case of the holding members 5a described in the first embodiment of the present invention, this coupling method has no need to take such a bonding process, thereby making it possible to carry out the coupling process easily by using the holding members through a simpler method. Moreover, in the aforementioned coupling method described in FIGS. 11A and 11B, the holding members are required to penetrate the active member layer and the second electrode layer; however, this method has no need to take such a penetrating process, making it possible to provide a desirable method without a reduction in the local strength due to the penetration.

Fourth Embodiment

The following description will discuss a polymer actuator having a laminated structure of multiple layers as a fourth embodiment of the present invention.

Figure 13B:
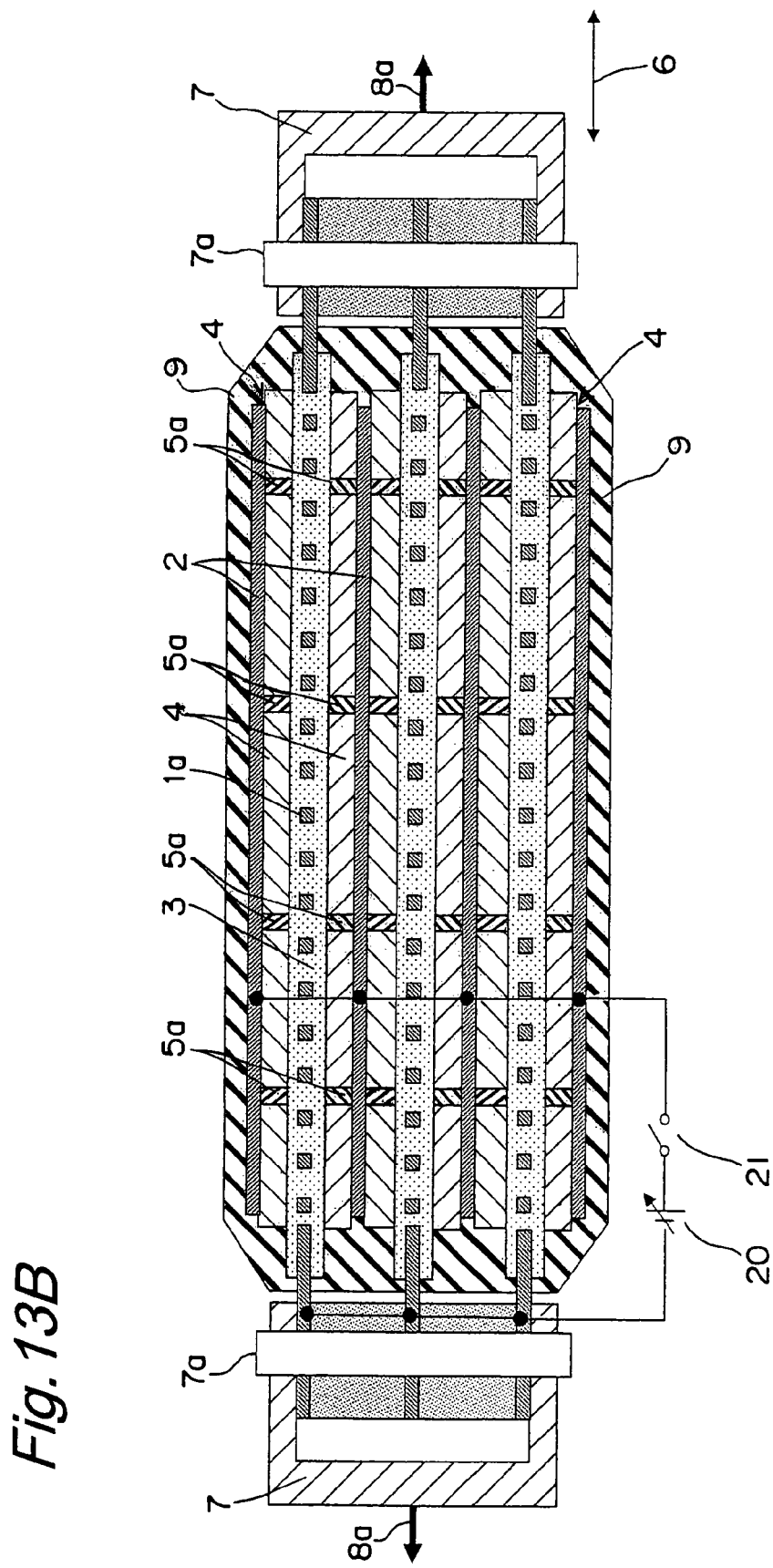
FIG. 13B is a cross-sectional view of the actuator in accordance with the one mode of the fourth embodiment of the present invention.

FIGS. 13A and 13B are a plane view and a cross-sectional view showing a polymer actuator in accordance with the fourth embodiment of the present invention. This actuator has a structure in which the active member layer 3, the electrolytic layer 4, and the electrode layer 2 are alternately laminated. In other words, for example, in FIG. 13B, a sheet of the uppermost layer of a lamination-type actuator is constituted by the second electrode layer 2, the first electrolytic layer 4a, the active member layer 3, the first electrolytic layer 4a, and the second electrode layer 2. Moreover, the second electrode layer 2 on the lower end of the lamination-type actuator of the uppermost layer (first layer) is compatibly used as the second electrode layer 2 on the upper end of the lamination-type actuator of an intermediate layer (second layer) located below the lamination-type actuator of the uppermost layer (first layer). Furthermore, on the second electrode layer 2, the first electrolytic layer 4a, the active member layer 3, the first electrolytic layer 4a, and the second electrode layer 2 of the lamination-type actuator of the intermediate layer (second layer) are successively placed. Here, the second electrode layer 2 on the lower end of the lamination-type actuator of the intermediate layer (second layer) is compatibly used as the second electrode layer 2 on the upper end of the lamination-type actuator of the lowermost layer (third layer) located below the lamination-type actuator of the intermediate layer (second layer). Moreover, on the second electrode layer 2, the first electrolytic layer 4a, the active member layer 3, the first electrolytic layer 4a, and the second electrode layer 2 of the lamination-type actuator of the lowermost layer (third layer) are successively placed.

In accordance with the lamination-type actuator of the fourth embodiment, since the constituent members of the actuator are plane thin-type members, a structure that is easily prepared through layer lamination processes can be achieved. With respect to the cross-sectional area ratio of the active member layer 3 relating to the expansion and contraction of the laminated actuator, the flat lamination structure of this type has the advantage that the packing density can be easily increased. As a result, with respect to the active member layer 3 of a conductive polymer layer that has a limitation in its cross-sectional area when prepared as a single layer, its cross-sectional area can be increased so that it is desirably used for achieving an actuator having a high generated force required upon application to robots and the like. Here, entering and leaving of ions through the active member layer 3 relate to diffusion processes, and in order to shorten the time required for the diffusion, there is a trade-off condition that the thickness of the active member layer 3 needs to be made thinner. Therefore, it is desirable to laminate a number of thin active member layers 3 so as to increase the cross-sectional area.

As described earlier, in accordance with the present invention, it is possible to provide a polymer actuator that can generate a great force, provides a high-speed operation, is easily manufactured and in particular highly resistant to deformation, and has been dried so as to be operable in the air.

By properly combining the arbitrary embodiments of the aforementioned various embodiments, the effects possessed by the embodiments can be produced.

The polymer actuator of the present invention is a plane thin-type polymer actuator, which is a plane thin-type polymer actuator, comprising:

a conductive active member layer that is compatibly used as an electrode or has an electrode separately installed, and serves as a first electrode layer;

a second electrode layer that is made face to face with the first electrode layer;

a first electrolytic layer at least made in contact with the active member layer and sealed between the two electrode layers, the first electrolytic layer being a solid-state electrolyte having an elastic modulus of 3 kN/m² or less, or a liquid-state electrolyte; and a holding member for maintaining a thickness between the active member layer and the second electrode layer, wherein by applying an electric field between the two electrode layers, at least one type of ions selected from anions and cations are allowed to enter or leave the active member layer through the first electrolytic layer so as to expand or contract the active member layer; therefore, it is possible to provide the actuator that is effectively used as each of driving sources for various apparatuses typically represented by such apparatuses as robots for use in nursing assist jobs or as home-use robots, and also serves as a driving source that is small-sized, light weight and flexible, and used safely.

Although the present invention has been fully described in connection with the preferred embodiments thereof with reference to the accompanying drawings, it is to be noted that various changes and modifications are apparent to those skilled in the art. Such changes and modifications are to be understood as included within the scope of the present invention as defined by the appended claims unless they depart therefrom.

What is claimed is:

1. A polymer actuator, which is a plane thin-type polymer actuator, comprising:
   a conductive active member layer that is compatibly used as an electrode or has an electrode separately installed, and serves as a first electrode layer;
   a second electrode layer that is made face to face with the first electrode layer;
   a first electrolytic layer at least made in contact with the active member layer and sealed between the active member layer and the second electrode layer, the first electrolytic layer being a solid-state electrolyte having an elastic modulus of 3 kN/m² or less, or a liquid-state electrolyte; and
   a holding member for maintaining a thickness between the active member layer and the second electrode layer,
   wherein by applying an electric field between the two electrode layers, at least one type of ions selected from anions and cations are allowed to enter or leave the active member layer through the first electrolytic layer so as to expand or contract the active member layer.

2. The polymer actuator according to claim 1, wherein the electrolytic layer interpolated between the two electrode layers is made of only the first electrolytic layer, and the active member layer and the second electrode are coupled to each other by the holding member used for holding the thickness.

3. The polymer actuator according to claim 2, wherein the holding member is formed by solidifying ionic liquid.

4. The polymer actuator according to claim 1, wherein the electrolytic layer interpolated between the two electrode layers is constituted by the first electrolytic layer made in contact with the active member layer and a second solid-state electrolytic layer made in contact with the first electrolytic layer, and the active member layer and the second solid-state electrolytic layer are coupled to each other by the holding member used for holding the thickness.

5. The polymer actuator according to claim 4, wherein the second solid-state electrolytic layer and the holding member are integrally formed as a solid-state electrolyte.

6. The polymer actuator according to claim 4, wherein the second electrode layer and the second solid-state electrolyte are divided into a plurality of portions in a driving direction of the actuator.

7. The polymer actuator according to claim 4, wherein the first electrolytic layer is made from a solid-state electrolyte having an elastic modulus of 3 kN/m² or less and prepared by gelling an ionic liquid consisting of anions and cations, with a rigidity thereof being made smaller than that of the second solid-state electrolyte.

8. The polymer actuator according to claim 1, wherein the first electrolytic layer is a liquid-state electrolyte that is an ionic liquid consisting of anions and cations.

9. The polymer actuator according to claim 1, which is formed by alternately laminating the active member layer, the electrolytic layers and the electrode layer.

10. The polymer actuator according to claim 1, wherein a force action portion of the actuator is coupled to one end of the active member layer in a driving direction of the actuator.

11. The polymer actuator according to claim 10, wherein an entire portion of the actuator except for the force action portion is covered with a flexible sealing member that does not disturb action of the force action portion.

12. The polymer actuator according to claim 1, wherein the active member layer is an inherently conducting polymer layer or a conductive member containing at least one material selected from a group consisting of carbon-based fine particles, metal-based fine particles, metal-oxide fine particles, carbon nano-fibers, and carbon nano-tubes.

13. The polymer actuator according to claim 1, wherein the holding member is disposed, with its longitudinal direction being set in a direction orthogonal to expansion and contraction directions of the active member layer.

14. The polymer actuator according to claim 1, wherein the holding member is formed to have a cross section having a trapezoidal shape or a cross section having a cone shape so that a cross-sectional area on a second electrode layer side is made greater than a cross-sectional area on an opposite side thereof.

* * * * *

UNITED STATES PATENT AND TRADEMARK OFFICE
CERTIFICATE OF CORRECTION

PATENT NO. : 7,679,268 B2
APPLICATION NO. : 11/806001
DATED : March 16, 2010
INVENTOR(S) : Kazuo Yokoyama et al.

It is certified that error appears in the above-identified patent and that said Letters Patent is hereby corrected as shown below:

In the Claims

In column 24, claim 3, (original claim 8), line 43, "solidifying ionic liquid" should read --solidifying an ionic liquid--.

Signed and Sealed this

Thirtieth Day of November, 2010

David J. Kappos
*Director of the United States Patent and Trademark Office*